US011935235B2

United States Patent
Abramoff et al.

(10) Patent No.: US 11,935,235 B2
(45) Date of Patent: *Mar. 19, 2024

(54) DIAGNOSIS OF A DISEASE CONDITION USING AN AUTOMATED DIAGNOSTIC MODEL

(71) Applicant: UNIVERSITY OF IOWA RESEARCH FOUNDATION, Iowa City, IA (US)

(72) Inventors: Michael Abramoff, Iowa City, IA (US); Gwenole Quellec, Brest (FR)

(73) Assignees: UNIVERSITY OF IOWA RESEARCH FOUNDATION, Iowa City, IA (US); UNITED STATES GOVERNMENT AS REPRESENTED BY THE DEPARTMENT OF VETERANS AFFAIRS, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/901,582

(22) Filed: Sep. 1, 2022

(65) Prior Publication Data

US 2023/0076762 A1     Mar. 9, 2023

Related U.S. Application Data

(63) Continuation of application No. 16/158,093, filed on Oct. 11, 2018, now Pat. No. 11,468,558, which is a (Continued)

(51) Int. Cl.
*G06T 7/00* (2017.01)
*G06F 18/00* (2023.01)
(Continued)

(52) U.S. Cl.
CPC ............ *G06T 7/0012* (2013.01); *G06F 18/00* (2023.01); *G06T 7/75* (2017.01); *G06V 40/193* (2022.01);
(Continued)

(58) Field of Classification Search
CPC .................... G06T 7/0012; G06T 7/75; G06T 2207/10024; G06T 2207/20081;
(Continued)

(56) References Cited

U.S. PATENT DOCUMENTS 4,883,061 A    11/1989  Zeimer
4,998,533 A     3/1991  Winkelman
(Continued)

FOREIGN PATENT DOCUMENTS

AU    2012207076    7/2012
CA    2610345      12/2006
(Continued)

OTHER PUBLICATIONS

Abramoff, M. et al., Image Processing with Image. J Biophotonics Int. 2004; 11(7):36-42.
(Continued)

*Primary Examiner* — Katrina R Fujita
(74) *Attorney, Agent, or Firm* — Ballard Spahr LLP

(57) ABSTRACT

A method of identifying an object of interest can comprise obtaining first samples of an intensity distribution of one or more object of interest, obtaining second samples of an intensity distribution of confounder objects, transforming the first and second samples into an appropriate first space, performing dimension reduction on the transformed first and second samples, whereby the dimension reduction of the transformed first and second samples generates an object detector, transforming one or more of the digital images into the first space, performing dimension reduction on the
(Continued)

transformed digital images, whereby the dimension reduction of the transformed digital images generates one or more reduced images, classifying one or more pixels of the one or more reduced images based on a comparison with the object detector, and identifying one or more objects of interest from the classified pixels.

20 Claims, 11 Drawing Sheets

Related U.S. Application Data continuation of application No. 13/992,552, filed as application No. PCT/US2011/063537 on Dec. 6, 2011, now Pat. No. 10,140,699.

(60) Provisional application No. 61/420,497, filed on Dec. 7, 2010.

(51) Int. Cl.
 *G06T 7/73* (2017.01)
 *G06V 40/18* (2022.01)

(52) U.S. Cl.
 CPC .............. *G06T 2207/10024* (2013.01); *G06T 2207/20081* (2013.01); *G06T 2207/30041* (2013.01); *G06T 2207/30096* (2013.01); *G06V 2201/03* (2022.01)

(58) Field of Classification Search
 CPC ........... G06T 2207/30041; G06T 2207/30096; G06V 40/193; G06V 2201/03; G06F 18/00
 See application file for complete search history.

(56) References Cited

U.S. PATENT DOCUMENTS

| | | |
|---|---|---|
| 5,153,923 A | 10/1992 | Matsuba |
| 5,233,517 A | 8/1993 | Jindra |
| 5,270,924 A | 12/1993 | Hideshima |
| 5,303,709 A | 4/1994 | Dreher et al. |
| 5,557,686 A | 9/1996 | Brown |
| 5,857,030 A | 1/1999 | Gaborski et al. |
| 5,868,134 A | 2/1999 | Sugiyama et al. |
| 6,000,799 A | 12/1999 | Van de Velde |
| 6,003,993 A | 12/1999 | Webb |
| 6,044,181 A | 3/2000 | Szeliski et al. |
| 6,053,865 A | 4/2000 | Sugiyama et al. |
| 6,104,828 A | 8/2000 | Shioiri |
| 6,179,421 B1 | 1/2001 | Pang |
| 6,276,798 B1 | 8/2001 | Gil et al. |
| 6,453,057 B1 | 9/2002 | Marshall et al. |
| 6,549,646 B1 | 4/2003 | Yeh |
| 6,556,853 B1 | 4/2003 | Cabib et al. |
| 6,567,682 B1 | 5/2003 | Osterweil et al. |
| 6,674,894 B1 | 1/2004 | Parker et al. |
| 6,712,469 B2 | 3/2004 | Ando |
| 6,714,672 B1 | 3/2004 | Berestov et al. |
| 6,728,561 B2 | 4/2004 | Smith et al. |
| 6,731,782 B2 | 5/2004 | Ashton |
| 6,757,409 B2 | 6/2004 | Marshall et al. |
| 6,830,336 B2 | 12/2004 | Fransen |
| 6,845,260 B2 | 1/2005 | Liu et al. |
| 6,996,260 B1 | 2/2006 | Skands et al. |
| 7,104,958 B2 | 9/2006 | Crutchfield et al. |
| 7,206,435 B2 | 4/2007 | Fujimura et al. |
| 7,232,240 B2 | 6/2007 | Kosnik et al. |
| 7,242,810 B2 | 7/2007 | Chang |
| 7,343,032 B2 | 3/2008 | Oakley et al. |
| 7,474,775 B2 | 1/2009 | Abramoff et al. |
| 7,524,061 B2 | 4/2009 | Yan et al. |
| 7,574,028 B2 | 8/2009 | Luo et al. |
| 7,578,028 B2 | 8/2009 | Sellars |
| 7,620,501 B2 | 11/2009 | Tek et al. |
| 7,712,898 B2 | 5/2010 | Abramoff et al. |
| 7,715,597 B2 | 5/2010 | Costache et al. |
| 8,140,329 B2 | 3/2012 | Zhang et al. |
| 8,180,134 B2 | 5/2012 | Wang |
| 8,194,936 B2 | 6/2012 | Abramoff et al. |
| 8,340,437 B2 | 12/2012 | Abramoff et al. |
| 8,463,065 B2 | 6/2013 | Sun et al. |
| 8,611,623 B2 | 12/2013 | Kurihara et al. |
| 8,616,702 B2 | 12/2013 | Abramoff |
| 8,634,628 B2 | 1/2014 | Inoue |
| 8,639,002 B2 | 1/2014 | Tanaka et al. |
| 8,687,862 B2 | 4/2014 | Hsu |
| 8,761,473 B2 | 6/2014 | Ihara |
| 8,842,894 B2 | 9/2014 | Ihara |
| 8,965,112 B1 | 2/2015 | Ibarz |
| 9,307,926 B2 | 4/2016 | Begin et al. |
| 9,355,458 B2 | 5/2016 | Ihara |
| 9,679,389 B2 | 6/2017 | Ostrovsky-Berman et al. |
| 9,881,234 B2 | 1/2018 | Huang |
| 9,924,867 B2 | 3/2018 | Abramoff |
| 10,223,610 B1 | 3/2019 | Akselrod-Ballin |
| 2002/0024516 A1 | 2/2002 | Chen et al. |
| 2002/0126915 A1 | 9/2002 | Lai et al. |
| 2002/0165837 A1 | 11/2002 | Zhang et al. |
| 2003/0071970 A1 | 4/2003 | Donnerhacke et al. |
| 2003/0133605 A1 | 7/2003 | Tannhof |
| 2003/0166999 A1 | 9/2003 | Liu et al. |
| 2003/0215119 A1 | 11/2003 | Uppaluri et al. |
| 2004/0032488 A1 | 2/2004 | Harman |
| 2004/0037453 A1 | 2/2004 | Marshall et al. |
| 2004/0064057 A1 | 4/2004 | Siegel |
| 2004/0085542 A1 | 5/2004 | Soliz et al. |
| 2004/0105074 A1 | 6/2004 | Soliz et al. |
| 2005/0100208 A1 | 5/2005 | Suzuki |
| 2005/0129306 A1 | 6/2005 | Wang |
| 2006/0023990 A1 | 2/2006 | Shih et al. |
| 2006/0056727 A1 | 3/2006 | Jones et al. |
| 2006/0119858 A1 | 6/2006 | Knighton et al. |
| 2006/0140446 A1 | 6/2006 | Luo et al. |
| 2006/0251293 A1 | 11/2006 | Piirainen |
| 2007/0002275 A1 | 1/2007 | Yan et al. |
| 2007/0020795 A1 | 1/2007 | Mori et al. |
| 2007/0058865 A1 | 3/2007 | Li et al. |
| 2007/0083492 A1 | 4/2007 | Hohimer et al. |
| 2007/0092864 A1 | 4/2007 | Reinhardt et al. |
| 2007/0110298 A1 | 5/2007 | Graepel et al. |
| 2007/0122007 A1 | 5/2007 | Austin et al. |
| 2007/0183661 A1 | 8/2007 | El-Maleh et al. |
| 2007/0230795 A1 | 10/2007 | Abramoff et al. |
| 2007/0244396 A1 | 10/2007 | Vilser et al. |
| 2007/0253171 A1 | 11/2007 | Cheng et al. |
| 2008/0205717 A1 | 8/2008 | Reeves et al. |
| 2008/0240547 A1 | 10/2008 | Cho et al. |
| 2008/0267483 A1 | 10/2008 | Zhan |
| 2008/0309881 A1 | 12/2008 | Huang et al. |
| 2009/0148024 A1 | 6/2009 | Park |
| 2009/0257024 A1 | 10/2009 | Luther et al. |
| 2010/0002929 A1 | 1/2010 | Sammak et al. |
| 2010/0034457 A1 | 2/2010 | Berliner et al. |
| 2010/0061601 A1 | 3/2010 | Abramoff et al. |
| 2010/0074532 A1 | 3/2010 | Gordon et al. |
| 2010/0082692 A1 | 4/2010 | Akinyemi et al. |
| 2010/0103249 A1 | 4/2010 | Lipton et al. |
| 2010/0104150 A1 | 4/2010 | Saint Felix et al. |
| 2010/0118161 A1 | 5/2010 | Tsurumi |
| 2010/0142767 A1 | 6/2010 | Fleming |
| 2010/0142824 A1 | 6/2010 | Lu |
| 2010/0177943 A1 | 7/2010 | Zhao et al. |
| 2010/0182406 A1 | 7/2010 | Benitez |
| 2010/0271511 A1 | 10/2010 | Ma et al. |
| 2010/0278420 A1 | 11/2010 | Shet |
| 2010/0284180 A1 | 11/2010 | Popovich et al. |
| 2011/0026794 A1 | 2/2011 | Sundar et al. |
| 2011/0091083 A1 | 4/2011 | Liu |
| 2011/0134221 A1 | 6/2011 | Lee et al. |
| 2011/0135172 A1 | 6/2011 | Kitamura |
| 2012/0155726 A1 | 6/2012 | Li |
| 2012/0236259 A1 | 9/2012 | Abramoff et al. |

(56) References Cited

U.S. PATENT DOCUMENTS

| | | |
|---|---|---|
| 2012/0237094 A1 | 9/2012 | Kurihara et al. |
| 2013/0208960 A1 | 8/2013 | Reisman |
| 2014/0016832 A1 | 1/2014 | Kong |
| 2014/0035901 A1 | 2/2014 | Chen et al. |
| 2014/0355861 A1 | 12/2014 | Nirenberg |
| 2015/0289822 A1 | 10/2015 | Dugan |
| 2015/0379708 A1 | 12/2015 | Abramoff et al. |
| 2016/0071266 A1 | 3/2016 | Srivastava |
| 2016/0100766 A1 | 4/2016 | Yoshioka |
| 2016/0104058 A1 | 4/2016 | He |
| 2016/0217586 A1 | 7/2016 | Dickrell, III |
| 2016/0292856 A1 | 10/2016 | Niemeijer |
| 2017/0014089 A1 | 1/2017 | Murakami |
| 2017/0147905 A1 | 5/2017 | Huang |
| 2017/0169567 A1 | 6/2017 | Chefd'hotel |
| 2017/0209096 A1 | 7/2017 | Ishii |
| 2017/0215812 A1 | 8/2017 | Yamaji |
| 2019/0130566 A1 | 5/2019 | Niemeijer |

FOREIGN PATENT DOCUMENTS

| | | |
|---|---|---|
| CA | 2825169 | 7/2012 |
| EP | 0905509 A1 | 3/1999 |
| EP | 2665406 | 7/2012 |
| JP | 2007-097634 A | 4/2007 |
| JP | 2010-500081 A | 1/2010 |
| JP | 60-05663 B2 | 10/2016 |
| WO | WO-89/05493 | 6/1989 |
| WO | WO-2005/076198 | 8/2005 |
| WO | WO-2006/023990 A2 | 3/2006 |
| WO | WO-2006/0105473 | 10/2006 |
| WO | WO-2007/031818 | 3/2007 |
| WO | WO-2007/118079 | 10/2007 |
| WO | WO-2008/150840 | 12/2008 |
| WO | WO-2009126112 A1 | 10/2009 |
| WO | WO-2010/099289 A1 | 9/2010 |
| WO | WO-2012/078636 | 6/2012 |
| WO | WO-2012/100221 | 7/2012 |
| WO | WO-2012/100225 A1 | 7/2012 |
| WO | WO-2012/106677 A2 | 8/2012 |
| WO | WO-2013/110668 A1 | 8/2013 |
| WO | WO-2014/143891 A1 | 9/2014 |

OTHER PUBLICATIONS

Adelson, E. et al., Pyramid Methods in Image Processing. RCA Engineer. 1984; 29(6):33-41.

Agurto et al., Detection and phenotyping of retinal disease using AM-FM processing for feature extraction. Signals, Systems and Computers, 2008 42nd Asilomar Conference on. IEEE, 2008.

Agurto et al., Multiscale AM-FM Methods for Diabetic Retinopathy Lesion Detection. Feb. 2010, Medical Imaging, IEEE Trans. 29(2):502-12.

Barriga et al., Automatic system for diabetic retinopathy screening based on AM-FM, partial least squares, and support vector machines. Apr. 2010, Biomedical Imaging: From Nano to Macro, 2010 IEEE International Symposium. pp. 1349-52.

Barriga et al., Multi-scale AM-FM for lesion phenotyping on age-related macular degeneration. Computer-Based Medical Systems, 2009. CBMS 2009. 22nd IEEE International Symposium on. IEEE, 2009.

Boroujeni et al., Coronary Artery Center-line Extraction Using Second Order Local Features. Comput Math Methods Med. 2012 (20 pages).

Can, A. et al., A Feature-Based Robust, Hierarchical, Algorithm for Registering Pairs of Images of the Curved Human Retina. IEEE Trans on Pattern analysis and Machine Intelligence. 2002; 24:347-64.

Can, A. et al., A Feature-Based Technique for Joint, Linear Estimation of High-Order Image-to-Mosaic Transformations: Mosaicing the Curved Human Retina. IEEE Trans on Pattern Analysis and Machine Intelligence. 2002; 24(3):412-9.

Can, A. et al., Rapid Automated Tracing and Feature Extraction from Retinal Fundus Images Using Direct Exploratory Algorithms. IEEE Trans on Information Technology in Biomedicine. 1999; 3:125-38.

Chanwimaluang, T., Hybrid Retinal Image Registration. IEEE Trans on Information Technology in Biomedicine. 2006; 10:129-42.

Choe, T. et al., Optimal Global Mosaic Generation from Retinal Images. Int Conf on Pattern Recognition. 2006; 3:681-4.

Chrástek et al., Automated Calculation of Retinal Arteriovenous Ratio for Detection and Monitoring of Cerebrovascular Disease Based on Assessment of Morphological Changes of Retinal Vascular System. MVA 2002 Proc IAPR Workshop Machine Vision App. 2002; pp. 240-243.

Chrastek et al., Automated Segmentation of the Optic Nerve Head for Diagnosis of Glaucoma. Med Image Anal. 2005; 9:297-314.

Deng, K. et al., Retinal Fundus Image Registration via Vascular Structure Graph Matching. Int J Biomed Imag. 2010. (19 pages).

Eye Conditions Encyclopedia, "Optic Nerve Imaging"; EyeMDLink.com; Dec. 3, 2005; pp. 1-2.

Frangi et al., Multiscale Vessel Enhancement Filtering. Medical Image Computing and Computer-Assisted Intervention—MICCAI'98 Lecture Notes in Computer Sci. 1998; 1496:130-7.

Van Ginneken et al., IOP Image Processing Project Proposal: Computer-aided Diagnosis for Diabetic Retinopathy Detection in Fundus Images. Apr. 5, 2002; pp. 1-23.

Goatman, K., Automated Detection of Microaneurysms. Abstracts Reports. Biomed Phys Bioeng, University of Aberdeen. Retrieved from: <www.biomed.abdn.ac.uk/Abstracts/A07890/>. Jul. 10, 1997 (8 pages).

Ter Haar Romeny, B.M., Front-End Vision and Multi-Scale Image Analysis. Springer: 2003, pp. xiii-xviii.

Hackel, R. and Saine, P., Creating Retinal Fundus Maps. J Ophthalmic Photography. 2005; 27(1):10-8.

Huang et al., Development and Comparison of Automated Classifiers for Glaucoma Diagnosis Using Stratus Optical Coherence Tomography. Invest Ophthalmol Visual Sci. 2005; 46(11):4121-9.

Hyvärinen, A. and Oja, E., Independent Component Analysis: Algorithms and Applications. Neural Netw. 2000; 13(4-5):411-30.

Johnson et al., Structure and Function Evaluation (SAFE): II. Comparison of Optic Disk and Visual Field Characteristics. Am J Ophthalmol. 2003; 135(2):148-54.

Klein, B.E. et al., Cardiovascular Disease, Mortality, and Retinal Microvascular Characteristics in Type 1 Diabetes. Arch Intern Med. 2004; 164(17):1917-24.

Kondermann et al., Blood Vessel Classification into Arteries and Veins in Retinal Images. Proc SPIE. 2007; 6512:651247-1 to -9.

Lee et al., Retinal atlas statistics from color fundus images. Med Imaging: Image Processing. 2010 (10 pages).

Light Shaping Diffusers Including a Rear Projection System. Physical Optics Corp. 2003. Reprinted from the Aug. 1996 issue of Photonics Spectra © Laurin Publishing Co., Inc. [Retrieved on Apr. 15, 2010]. Retrieved from the Internet: <URL: http://www.poc.com/isd/default.asp?page=applications&sub=dst> p. 1. paragraph 7 (3 pages).

Lliev et al., Morphometric Assessment of Normal, Suspect and Glaucomatous Optic Discs with Stratus OCT and HRT II. Eye. 2005; pp. 1-12.

Maintz, J. and Viergever, M., A Survey of Medical Image Registration. Medical Image Analysis. 1998; 2(1):1-36.

Martus et al., Multivariate Approach for Quantification of Morphologic and Functional Damage in Glaucoma. Invest Ophthalmol Visual Sci. 41(5):1099-110.

Muramatsu et al., Automated selection of major arteries and veins for measurement of arteriolar-to-venular diameter ratio on retinal fundus images. Comp Med Imaging Graphics. 2011; 35(6):472-80.

Niemeijer, M. et al., Automatic determination of the artery-vein ratio in retinal images. Proc SPIE—The Int Soc Optic Eng. 2010; 7624: 762401-1 to -10.

Quellec et al., Optimal Filter Framework for Automated, Instantaneous Detection of Lesions in Retinal Images. Oct. 21, 2010, Medical Imaging, IEEE Transactions on, 30(2): 523-33.

(56) References Cited

OTHER PUBLICATIONS

Quellec et al., Optimal wavelet transform for the detection of microaneurysms in retina photographs. IEEE Trans Med Imaging 27.9. 2008; 1230-41.
Ritter, N. et al., Registration of Stereo and Temporal Images of the Retina. IEEE Trans on Medical Imaging. 1999; 18:404-18.
"Segmentation"; Image Processing Fundamentals—Segmentation; Website: www.ph.tn.tudelft.nl/Courses/FIP/frames/fip-Segmenta. html; pp. 1-9.
Sharrett, A.R. et al., Retinal Arteriolar Diameters and Elevated Blood Pressure. Am J Epidemiol. 1999; 150(3):263-70.
Staal, J. et al., Ridge-based Vessel Segmentation in Color Images of the Retina. IEEE Trans on Medical Imaging. 2004; 23(4):501-9.
Swindale et al., Automated Analysis of Normal and Glaucomatous Optic Nerve Head Topography Images. Invest Ophthalmol Visual Sci. 2000; 41(7):1730-42.
Szymczak et al., Coronary Vessel Trees from 3D Imagery: a Topographical Approach. Med Image Anal. 2006; 10(4):548-59.
Toderici, G. et al., Evaluation of Variability and Significance of Fundus Camera Lens Distortion. Proc 26th Annual Int Conf of the IEEE Eng in Med and Bo Soc. pp. 1-5 (San Francisco, CA; Sep. 2004).
Tuytelaars et al., Matching widely separated views based on affine invariant regions. Int J Comp Vision 59.1. 2004; pp. 61-85.
Vincent, L., Morphological Grayscale Reconstruction in Image Analysis: Applications and Efficient Algorithms. IEEE Trans on Image Processing. 1993; 2:176-201.
Weng, J. et al., Camera Calibration with Distortion Models and Accuracy Evaluation. IEEE Trans on Pattern Analysis and Machine Intelligence. 1992; 14(10):965-80.
Wong et al., Computer-Assisted Measurement of Retinal Vessel Diameters in the Beaver Dam Eye Study Methodology: Correlation Between Eyes and Effect of Refractive Errors. Ophthalmology. 2004; 111(6):1183-90.
Xu, J. and Chutatape, O., Comparative Study of Two Calibration Methods on Fundus Camera. Proc 26th Annual Int Conf of the IEEE Eng in Med and Bio Soc. pp. 576-9 (Cancun, Mexico; 2003).
Yale Medicine Winter/Spring 1998, Imaging the Eye. Medicine's New Eyes. pp. 1-3.
Zomet, A., Seamless Image Stitching by Minimizing False Edges. IEEE Trans on Image Processing. 2006; 15:969-77.
International Search Report and Written Opinion dated Jan. 3, 2008 by the International Searching Authority for Patent Application No. PCT/US2006/012191, which was filed on Mar. 31, 2006 and published as WO 2006/105473 on Oct. 5, 2006 (Inventor—Abramoff et al.; Applicant—University of Iowa Research Foundation et al.;) (7 pages).
International Preliminary Report on Patentability dated Mar. 10, 2009 by the International Searching Authority for Patent Application No. PCT/US2006/012191, which was filed on Mar. 31, 2006 and published as WO 2006/105473 on Oct. 5, 2006 (Inventor—Abramoff et al.; Applicant—University of Iowa Research Foundation et al.;) (6 pages).
International Search Report and Written Opinion dated Sep. 17, 2008 by the International Searching Authority for Patent Application No. PCT/US2007/065862, which was filed on Apr. 3, 2007 and published as WO 2007/118079 on Oct. 18, 2007 (Inventor—Abramoff et al.; University of Iowa Research Foundation et al.;) (4 pages).
International Preliminary Report on Patentability dated Nov. 4, 2008 by the International Searching Authority for Patent Application No. PCT/US2007/065862, which was filed on Apr. 3, 2007 and published as WO 2007/118079 on Oct. 18, 2007 (Inventor—Abramoff et al.; University of Iowa Research Foundation et al.;) (4 pages).
International Search Report and Written Opinion dated Oct. 15, 2008 by the International Searching Authority for Patent Application No. PCT/US2008/065043, which was filed on May 29, 2008 and published as WO 2008/150840 on Dec. 11, 2008 (Inventor—Abramoff et al.; Applicant—University of Iowa Research Foundation;) (6 pages).
International Preliminary Report on Patentability dated Dec. 1, 2009 by the International Searching Authority for Patent Application No. PCT/US2008/065043, which was filed on May 29, 2008 and published as WO 2008/150840 on Dec. 11, 2008 (Inventor—Inventor—Abramoff et al.; Applicant—University of Iowa Research Foundation;) (5 pages).
International Search Report and Written Opinion dated May 3, 2010 by the International Searching Authority for Patent Application No. PCT/US2010/025369, which was filed on Feb. 25, 2010 and published as WO 2010/099289 on Sep. 2, 2010 (Inventor—Abramoff et al.; Applicant—University of Iowa Research foundation;) (9 pages).
International Preliminary Report on Patentability dated Aug. 30, 2011 by the International Searching Authority for Patent Application No. PCT/US2010/025369, which was filed on Feb. 25, 2010 and published as WO 2010/099289 on Sep. 2, 2010 (Inventor—Abramoff et al.; Applicant—University of Iowa Research foundation;) (8 pages).
International Search Report and Written Opinion was dated Apr. 3, 2012 by the International Searching Authority for Application No. PCT/US2011/63537, which was filed on Dec. 6, 2011 and published as WO 2012/078636 on Jun. 14, 2012 (Inventor—Abramoff et al.; Applicant—University of Iowa Research Foundation;) (11 Pages).
International Preliminary Report on Patentability was dated Jun. 12, 2013 by the International Searching Authority for Application No. PCT/US2011/63537, which was filed on Dec. 6, 2011 and published as WO 2012/078636 on Jun. 14, 2012 (Inventor—Abramoff et al.; Applicant—University of Iowa Research Foundation;) (10 Pages).
Preliminary Amendment was dated Jun. 7, 2013 to the U.S. Patent and Trademark Office for U.S. Appl. No. 13/992,552, which was filed Jul. 25, 2013 and published as US 2013/0301889 on Nov. 4, 2013 (Inventor—Abramoff et al.; Applicant—University of Iowa Research Foundation;) (8 Pages).
Non Final Rejection was dated May 11, 2015 by the U.S. Patent and Trademark Office for U.S. Appl. No. 13/992,552, which was filed Jul. 25, 2013 and published as US 2013/0301889 on Nov. 4, 2013 (Applicant—University of Iowa Research Foundation; Inventor—Abramoff et al.;) (31 Pages).
Response to Non Final Rejection was dated Oct. 12, 2015 to the U.S. Patent and Trademark Office for U.S. Appl. No. 13/992,552, which was filed Jul. 25, 2013 and published as US 2013/0301889 on Nov. 4, 2013 (Applicant—University of Iowa Research Foundation; Inventor—Abramoff, et al.;) (12 Pages).
Final Rejection was dated Nov. 13, 2015 by the U.S. Patent and Trademark Office for U.S. Appl. No. 13/992,552, which was filed Jul. 25, 2013 and published as US 2013/0301889 on Nov. 4, 2013 (Applicant—University of Iowa Research Foundation; Inventor—Abramoff et al.;) (32 Pages).
Non Final Rejection was dated Jul. 11, 2016 by the U.S. Patent and Trademark Office for U.S. Appl. No. 13/992,552, which was filed Jul. 25, 2013 and published as US 2013/0301889 on Nov. 4, 2013 (Applicant—University of Iowa Research Foundation; Inventor—Abramoff et al.;) (37 Pages).
Final Rejection was dated Mar. 28, 2017 by the U.S. Patent and Trademark Office for U.S. Appl. No. 13/992,552, which was filed Jul. 25, 2013 and published as US 2015/0379708 on Dec. 31, 2015 (Inventor—Abramoff et al.; Applicant—University of Iowa Research Foundation;) (39 pages).
Non-Final Office Action dated Dec. 11, 2017 by the U.S. Patent and Trademark Office for U.S. Appl. No. 13/992,552, which was filed Jul. 25, 2013 and published as US 2015/0379708 on Dec. 31, 2015 (Inventor—Abramoff et al.; Applicant—University of Iowa Research Foundation;) (33 pages).
Notice of Allowance dated Jul. 11, 2018 by the U.S. Patent and Trademark Office for U.S. Appl. No. 13/992,552, which was filed Jul. 25, 2013 and published as US 2015/0379708 on Dec. 31, 2015 (Inventor—Abramoff et al.; Applicant—University of Iowa Research Foundation;) (8 pages).

(56) References Cited

OTHER PUBLICATIONS

International Search Report and Written Opinion dated May 8, 2012 by the International Searching Authority for Patent Application No. PCT/US2012/022115, which was filed on Jan. 20, 2012 and published as WO 2012/100225 on Jul. 26, 2012 (Inventor—Abramoff et al.; Applicant—University of Iowa Research Foundation;) (6 pages).
International Preliminary Report on Patentability dated Jul. 23, 2013 by the International Searching Authority for Patent Application No. PCT/US2012/022115, which was filed on Jan. 20, 2012 and published as WO 2012/100225 on Jul. 26, 2012 (Inventor—Abramoff et al.; Applicant—University of Iowa Research Foundation;) (5 pages).
European Search Report dated Mar. 16, 2016 by the European Patent Office for Application No. 12736290.3, which was filed on Jan. 20, 2011, and published as 2665406, on Nov. 27, 2013 (Inventor—Abramoff et al.; Applicant—University of Iowa Research Foundation;) (11 Pages).
International Search Report and Written Opinion dated May 25, 2012 by the International Searching Authority for Application No. PCT/US2012/022111, which was filed on Jan. 20, 2012 and published as WO 2012/100221 on Jul. 26, 2012 (Inventor—Abramoff et al.; Applicant—University of Iowa Research Foundation;) (7 Pages).
International Preliminary Report on Patentability was dated Jul. 23, 2013 by the International Searching Authority for Application No. PCT/US2012/022111, which was filed on Jan. 20, 2012 and published as WO 2012/100221 on Jul. 26, 2012 (Inventor—Abramoff et al.; Applicant—University of Iowa Research Foundation;) (6 Pages).
Preliminary Amendment was dated Jun. 19, 2012 to the U.S. Patent and Trademark Office for U.S. Appl. No. 13/355,386, which was filed Jan. 20, 2012 and published as US 2012/0236259 on Sep. 20, 2012 (Applicant—University of Iowa Research Foundation; Inventor—Abramoff et al.;) (3 Pages).
Non Final Rejection was dated Sep. 19, 2013 by the U.S. Patent and Trademark Office for U.S. Appl. No. 13/355,386, which was filed Jan. 20, 2012 and published as US 2012/0236259 on Sep. 20, 2012 (Applicant—University of Iowa Research Foundation; Inventor—Abramoff et al.;) (16 Pages).
Response to Non Final Rejection was dated Dec. 19, 2013 to the U.S. Patent and Trademark Office for U.S. Appl. No. 13/355,386, which was filed Jan. 20, 2012 and published as US 2012/0236259 on Sep. 20, 2012 (Applicant—University of Iowa Research Foundation; Inventor—Abramoff f et al.;) (10 Pages).
Final Rejection was dated Mar. 11, 2014 by the U.S. Patent and Trademark Office for U.S. Appl. No. 13/355,386, which was filed Jan. 20, 2012 and published as US 2012/0236259 on Sep. 20, 2012(Applicant—University of Iowa Research Foundation; Inventor—Abramoff et al.;) (17 Pages).
Non Final Rejection was dated Feb. 6, 2015 by the U.S. Patent and Trademark Office for U.S. Appl. No. 13/355,386, which was filed Jan. 20, 2012 and published as US 2012/0236259 on Sep. 20, 2012 (Applicant—University of Iowa Research Foundation; Inventor—Abramoff et al.;) (13 Pages).
Response to Non Final Rejection was dated May 6, 2015 to the U.S. Patent and Trademark Office for U.S. Appl. No. 13/355,386, which was filed Jan. 20, 2012 and published as US 2012/0236259 on Sep. 20, 2012 (Applicant—University of Iowa Research Foundation; Inventor—Abramoff et al.;) (11 Pages).
Final Rejection dated Jun. 23, 2015 by the U.S. Patent and Trademark Office for U.S. Appl. No. 13/355,386, which was filed Jan. 20, 2012 and published as US 2012/0236259 on Sep. 20, 2012 (Applicant—University of Iowa Research Foundation; Inventor—Abramoff et al.;) (17 Pages).
Response to Final Rejection dated Aug. 24, 2015 to the U.S. Patent and Trademark Office for U.S. Appl. No. 13/355,386, which was filed Jan. 20, 2012 and published as US 2012/0236259 on Sep. 20, 2012 (Applicant—University of Iowa Research Foundation; Inventor—Abramoff et al.;) (11 Pages).

Non Final Rejection dated Mar. 30, 2016 by the U.S. Patent and Trademark Office for U.S. Appl. No. 13/355,386, which was filed Jan. 20, 2012 and published as US 2012/0236259 on Sep. 20, 2012 (Applicant—University of Iowa Research Foundation; Inventor—Abramoff et al.;) (12 Pages).
Response to Non Final Rejection dated Sep. 30, 2016 to the U.S. Patent and Trademark Office for U.S. Appl. No. 13/355,386, which was filed Jan. 20, 2012 and published as US 2012/0236259 on Sep. 20, 2012 (Applicant—University of Iowa Research Foundation; Inventor—Abramoff f et al.;) (9 Pages).
Final Rejection dated Nov. 9, 2016 by the U.S. Patent and Trademark Office for U.S. Appl. No. 13/355,386, which was filed Jan. 20, 2012 and published as US 2012/0236259 on Sep. 20, 2012 (Applicant—University of Iowa Research Foundation; Inventor—Abramoff et al.;) (14 Pages).
Notice of Allowance dated Nov. 8, 2017 by the U.S. Patent and Trademark Office for U.S. Appl. No. 13/355,386, which was filed Jan. 20, 2012 and published as US 2012/0236259 on Sep. 20, 2012 (Applicant—University of Iowa Research Foundation; Inventor—Abramoff et al.;)(8 Pages).
Issue Notification dated Mar. 7, 2018 by the U.S. Patent and Trademark Office for U.S. Appl. No. 13/355,386, which was filed Jan. 20, 2012 and published as US 2012/0236259 on Sep. 20, 2012 (Applicant—University of Iowa Research Foundation; Inventor—Abramoff et al.;) (1 Page).
International Search Report and Written Opinion dated Sep. 4, 2014 by the International Searching Authority for Application No. PCT/US2014/014298, which was filed on Jan. 31, 2014 and published as WO/2014/158345 on Oct. 2, 2014 (Applicant—University of Iowa Research Foundation) (7 Pages).
International Preliminary Report on Patentability dated Aug. 4, 2015 by the International Searching Authority for Application No. PCT/US2014/014298, which was filed on Jan. 31, 2014 and published as WO/2014/158345 on Oct. 2, 2014 (Inventor—Abramoff et al.; Applicant—University of Iowa Research Foundation;) (6 Pages).
Preliminary Amendment dated Jul. 30, 2015 to the U.S. Patent and Trademark Office for U.S. Appl. No. 14/764,926, which was filed Jul. 30, 2015 and published as US 2015/0379708 on Dec. 31, 2015 (Applicant—University of Iowa Research Foundation; Inventor—Abramoff et al.;) (4 Pages).
Non Final Rejection dated Jan. 27, 2017 by the U.S. Patent and Trademark Office for U.S. Appl. No. 14/764,926, which was filed Jul. 30, 2015 and published as US 2015/0379708 on Dec. 31, 2015 (Applicant—University of Iowa Research Foundation; Inventor—Abramoff et al.;) (9 Pages).
International Search Report and Written Opinion dated Aug. 15, 2014 by the International Searching Authority for Application No. PCT/US2014/28055, which was filed on Mar. 14, 2014 and published as WO 2014/143891 on Sep. 18, 2014 (Inventor—Abramoff et al.; Applicant—University of Iowa Research Foundation;) (6 Pages).
International Preliminary Report on Patentability was dated Sep. 15, 2015 by the International Searching Authority for Application No. PCT/US2014/28055, which was filed on Mar. 14, 2014 and published as WO 2014/143891 on Sep. 18, 2014 (Inventor—Abramoff et al.; Applicant—University of Iowa Research Foundation) (5 Pages).
Non Final Rejection was dated Nov. 4, 2016 by the U.S. Patent and Trademark Office for U.S. Appl. No. 14/774,801, which was filed Sep. 11, 2015 and published as US 2016/0035088 on Feb. 4, 2016 (Applicant—University of Iowa Research Foundation; Inventor—Abramoff et al.;) (6 Pages).
Preliminary Amendment was dated Sep. 11, 2015 to the U.S. Patent and Trademark Office for U.S. Appl. No. 14/774,801, which was filed Sep. 11, 2015 and published as US 2016/0035088 on Feb. 4, 2016 (Applicant—University of Iowa Research Foundation; Inventor—Abramoff et al.;) (4 Pages).
Final Office Action dated May 12, 2017 by the U.S. Patent and Trademark Office for U.S. Appl. No. 14/774,801, which was filed Sep. 21, 2015 and published as US 2016/0035088 on Feb. 4, 2016 (Applicant—University of Iowa Research Foundation; Inventor—Abramoff et al.;) (7 Pages).

(56) References Cited

OTHER PUBLICATIONS

Non-Final Office Action dated Nov. 17, 2017 by the U.S. Patent and Trademark Office for U.S. Appl. No. 14/774,801, which was filed Sep. 21, 2015 and published as US 2016/0035088 on Feb. 4, 2016 (Applicant—University of Iowa Research Foundation; Inventor—Abramoff et al.;) (8 Pages).
Final Office Action dated Jul. 23, 2018 by the U.S. Patent and Trademark Office for U.S. Appl. No. 14/774,801, which was filed Sep. 21, 2015 and published as US 2016/0035088 on Feb. 4, 2016 (Applicant—University of Iowa Research Foundation; Inventor—Abramoff et al.;) (8 Pages).
International Search Report and Written Opinion was dated Aug. 5, 2015 by the International Searching Authority for Application No. PCT/US2015/022021, which was filed on Mar. 23, 2015 and published as WO 2015/143435 on Sep. 24, 2015 (Inventor—Abramoff et al.; Applicant—University of Iowa Research Foundation;) (9 Pages).
International Preliminary Report on Patentability was dated Sep. 21, 2016 by the International Searching Authority for Application No. PCT/US2015/022021, which was filed on Mar. 23, 2015 and published as WO 2015/143435 on Sep. 24, 2015 (Inventor—Abramoff et al.; Applicant—University of Iowa Research Foundation;) (6 Pages).
Non Final Rejection dated Dec. 22, 2017 by the U.S. Patent and Trademark Office for U.S. Appl. No. 15/128,035, which was filed Sep. 21, 2016 and published as US 2017/0098311 on Apr. 6, 2017 (Inventor—Abramoff et al.; Applicant—University of Iowa Research Foundation et al.;) (16 pages).
Final Office Action dated Aug. 28, 2018 by the U.S. Patent and Trademark Office for U.S. Appl. No. 15/128,035, which was filed Sep. 21, 2016 and published as US 2017/0098311 on Apr. 6, 2017 (Inventor—Abramoff et al.; Applicant—University of Iowa Research Foundation et al.;) (19 pages).
Non-Final Office Action dated Dec. 18, 2015 by the U.S. Patent and Trademark Office for U.S. Appl. No. 14/397,756, which was filed Oct. 29, 2014 and now U.S. Pat. No. 9,545,196 on Jan. 17, 2017 (Inventor—Abramoff et al.; Applicant—University of Iowa Research Foundation et al.;) (5 pages).
Notice of Allowance dated Aug. 29, 2016 by the U.S. Patent and Trademark Office for U.S. Appl. No. 14/397,756, which was filed Oct. 29, 2014 and now U.S. Pat. No. 9,545,196 on Jan. 17, 2017 (Inventor—Abramoff et al.; Applicant—University of Iowa Research Foundation et al.;) (7 pages).
Non-Final Office Action dated May 18, 2018 by the U.S. Patent and Trademark Office for U.S. Appl. No. 15/371,925, which was filed Dec. 7, 2016 and published as US 2017/0236282 on Aug. 17, 2017 (Inventor—Abramoff et al.; Applicant—University of Iowa;) (6 pages).
Notice of Allowance dated Sep. 5, 2018 by the U.S. Patent and Trademark Office for U.S. Appl. No. 13/992,552, which was filed Jul. 25, 2013 and published as US 2013/0301889 on Nov. 4, 2013 (Inventor—Abramoff et al.; Applicant—University of Iowa Research Foundation;) (2 Pages).
C. Nieuwenhuis and M. Yan, "Knowledge based image enhancement using neural networks," 18th International Conference on Pattern Recognition (ICPR) , pp. 814-817, 2006 (Year: 2006).
Niemeijer, Meindert, et al. "Automatic Classification of Retinal Vessels into Arteries and Veins." Medical Imaging 2009: Computer-Aided Diagnosis, vol. 7260, Feb. 17, 2009, pp. 72601F-1-72601F-8., doi:10.1117/12.813826 (Year: 2009).
Hubbard, et al., Methods for evaluation of retinal microvascular abnormalities associated with hypertension/sclerosis in the atherosclerosis risk in communities study; Ophthalmology; vol. 106, Issue 12, 1999, pp. 2269-2280 (Year: 1999).
Knudtson MD, Lee KE, Hubbard LD, Wong TY, Klein R, Klein BE. Revised formulas for summarizing retinal vessel diameters. Curr Eye Res. Sep. 2003;27(3):143-9. doi: 10.1076/ceyr.27.3.143.16049 (Year: 2003).
Leung, Harry & Wang, Jie & Rochtchina, Elena & Tan, Ava & Wong, T-Y & Klein, Ronald & Hubbard, Larry & Mitchell, Paul. (2003). Relationships between Age, Blood Pressure, and Retinal Vessel Diameters in an Older Population. Investigative ophthalmology & visual science. 44. 2900-4. 10.1167/iovs.02-1114 (Year: 2003).

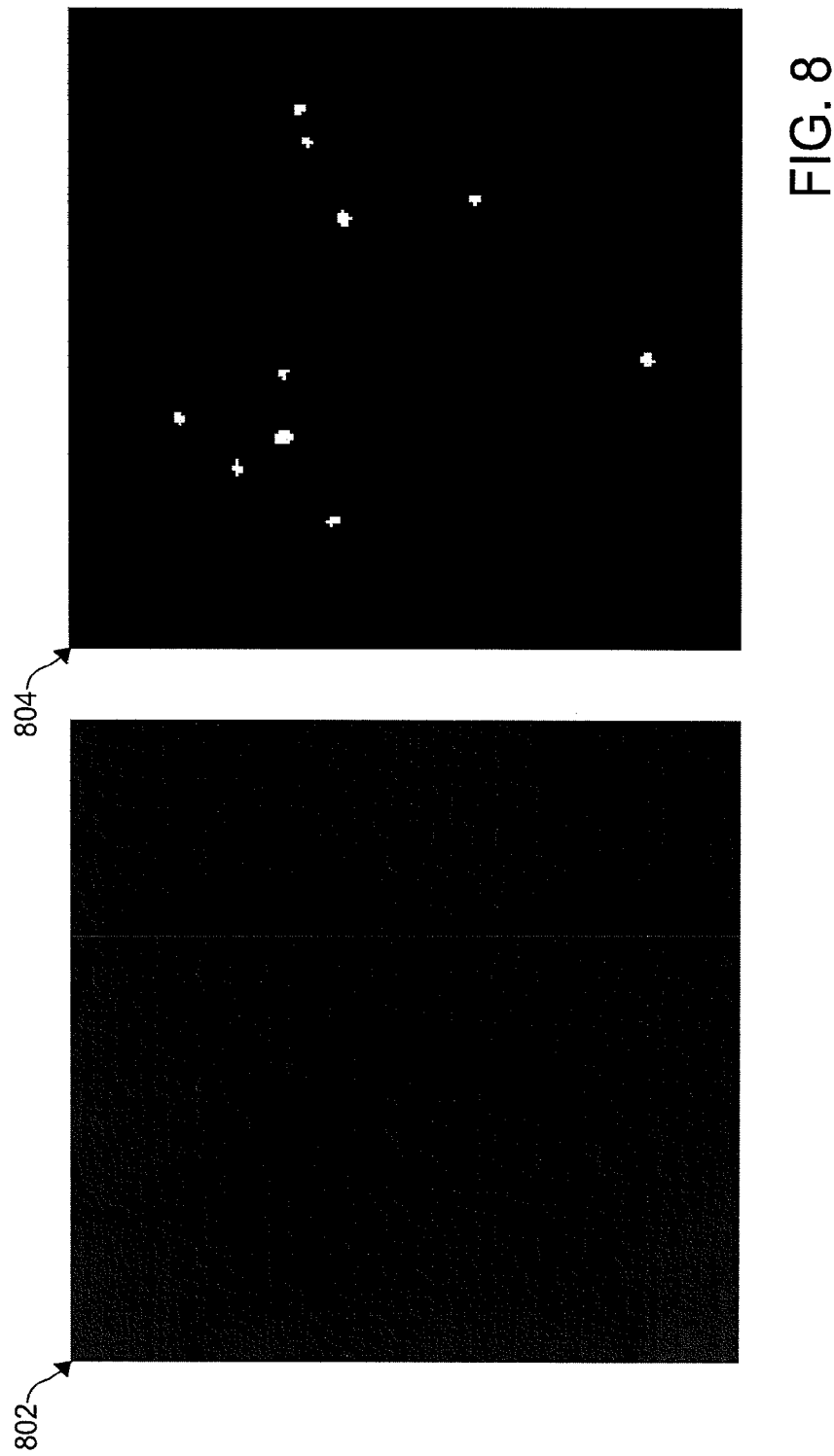

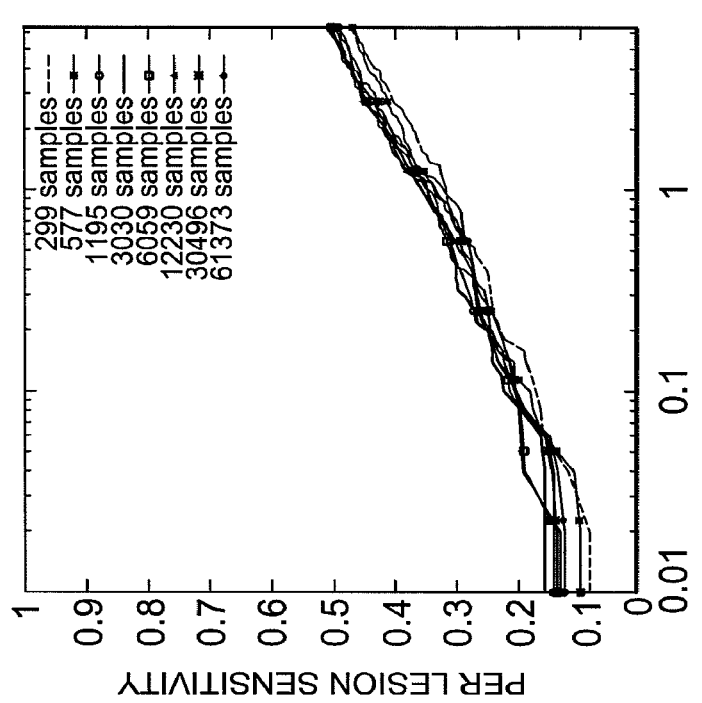
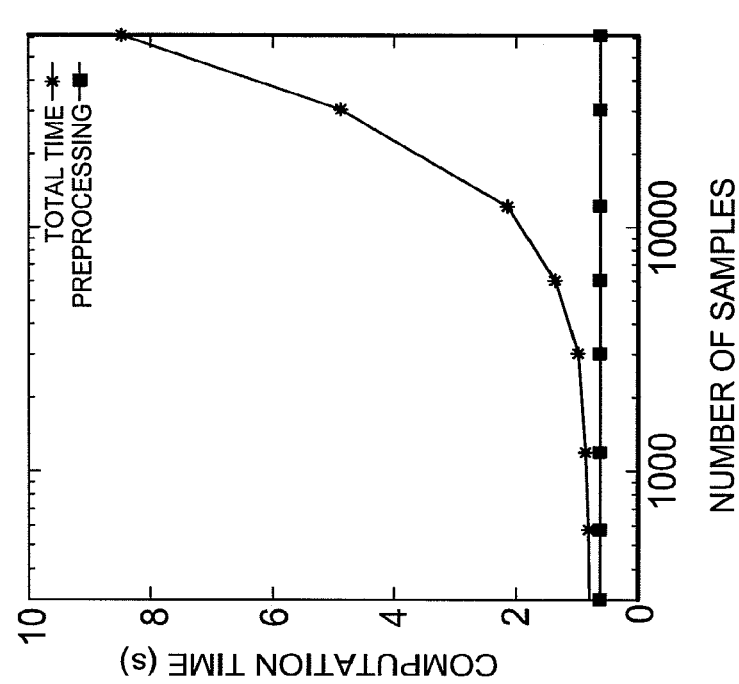
FIG. 10B
FIG. 10A

DIAGNOSIS OF A DISEASE CONDITION USING AN AUTOMATED DIAGNOSTIC MODEL

CROSS-REFERENCE TO RELATED PATENT APPLICATIONS

This application is a continuation of U.S. patent application Ser. No. 16/158,093, filed on Oct. 11, 2018, which is a continuation of U.S. patent application Ser. No. 13/992,552, filed on Jul. 25, 2013, and issued as U.S. Pat. No. 10,140,699 on Nov. 27, 2018, which is a U.S. National Phase Application of International Application No. PCT/US2011/063537, filed on Dec. 6, 2011, which claims priority to U.S. Provisional Patent Application No. 61/420,497, filed on Dec. 7, 2010, each of which are incorporated by reference in their entireties herein.

BACKGROUND

Automated detection of objects of interest in images has rapidly expanded in the last decade. For example, lesions caused by disorders of the eye, especially Diabetic Retinopathy (DR) and Age-related Macular Degeneration (AMD) can be detected through image analysis. One important motivation is the need for reproducible, efficient, early detection, or screening, of large at-risk populations. In particular, there is a preponderance of evidence that early detection and timely treatment of DR, the most common cause of blindness in the working age population of the United States and of the European Union, can prevent visual loss and blindness in patients with diabetes.

Most conventional efforts have focused on automatically detecting the lesions in color fundus photographs, as this is a non-invasive and cost-effective modality. One study of a large screening dataset has shown that, even though some automated detection algorithms achieve a detection performance comparable to that of human experts, further improvements are desirable before they translation into clinical practice. A primary step in automated detection of DR is the detection of microaneurysms, which are highly pathognomic and often the first sign of DR, although it has been shown that detecting other lesions can improve DR detection performance. However, current methods fail to sufficiently differentiate lesions from retinal blood vessels: when a more sensitive setting was used, false positives occurred on the vessels, while when a specific setting was used, lesions connected to or close to the vasculature were missed.

Several automated detection algorithms for detecting the lesions of AMD, the most common macular disease associated with aging and the most important cause of blindness and visual loss in the developed world, have also been published. In particular, these efforts have focused on drusen, the hallmark of AMD. One of the main challenges in detecting drusen is the ability to differentiate them from bright lesions caused by other diseases, in particular, DR's exudates and cotton wool spots, as well as subtle, drusen-like lesions such as the flecks related to Stargardt's disease. AMD tends to occur in older patients than Stargardt's disease, but both the individual drusen and flecks, as well as their distribution, are very similar.

Negative lesion confounders are typically structures that are similar looking, but not the target lesion such as vessel portions in the microaneurysm case and exudates, cotton-wool spots and Stargardt flecks in the drusen case. Positive lesion confounders are typically a subset of target lesions that are easily missed because they have specific properties that are substantially different from the standard case, but should still be detected. In the case of microaneurysm detection, these are microaneurysms connected to the vasculature, for example. In other words, negative lesion confounders are the false positives of simple detectors and positive lesion confounders are the false negatives of simple detectors. Typically, lesions are hardly detected if they are not specifically modeled. In both cases, lesions that are proximate to other lesions, including being fused with these other lesions, also are positive lesion confounders.

Additionally, retinal vessel bifurcations are important landmarks in retinal images. Their metrics are important for clinical evaluation as well as input for downstream image processing, such as retinal image registration and branching analysis. Because of their geometrical stability, they could be the feature points for image registration and change detection. They are important targets in the vessel segmentation problem and analysis of the retinal vessel trees. Accordingly, system and methods for detecting and/or differentiating objects of interest such as lesions, bifurcations, abnormalities, and/or other identifiable objects or collections of pixels, are desirable.

SUMMARY

It is to be understood that both the following general description and the following detailed description are exemplary and explanatory only and are not restrictive, as claimed. Provided are methods and systems for optimal, user-friendly, object background separation have been developed, wherein the system and method provide a means to indicate/detect characteristics of an image such as legions evidencing a disease.

The present invention is a new, fast way to detect objects in images, where the detectors for these objects can be optimized. It can be used in a variety of applications, such as to detect abnormalities and other structures in retinal images, in other medical images, and in any other images, including robotic and computer vision as well as in online search. For example, very good results are achieved in images of the retina, of blood cells, of fruit trees, and in satellite images of helicopter landing pads.

For example if one needs to find apples in images taken from the Internet, the user would indicate a few example apples in a few images, the algorithm then finds the optimal detectors for such apples, and can be used to quickly find apples in millions of images. Another advantage therefore is that no expert knowledge of the algorithm or image processing is needed, and the user only needs to be able to indicate the objects that are to be found.

With respect to retinal imaging, one problem with prior approaches is that normal tissue which resembles abnormalities were detected as abnormalities, while other abnormalities lying close to specific structures such as vessels are missed. In other words, the detectors are not optimal. The new method of the present invention is substantially faster, and finally mimics quite closely the processing of visual information by the brain. One reason for these improvements is the use of optimal detectors, and these are developed in the new approach in a very systematic way.

In an aspect, an optimal filter framework is provided to solve lesion segmentation and differentiation problems in retinal images, including but not limited to microaneurysm detection and drusen versus flecks differentiation. As an example, the optimal filter framework can provide detection that is as close to instantaneous as possible. As a further example, the optimal filter framework can allow instantaneous feedback to the camera operator, as well as immediate feedback of the detection results to the patient.

In an aspect, the optimal filter framework can automatically generate features adapted for differentiating target lesions, including atypical target lesions, from negative lesion confounders. As an example, the optimal filter framework can rely on the generation of a set of filters matched both to the lesions and to common positive as well as negative lesion confounders.

In an aspect, the design of an exemplary filter can be defined as one of the following:
1) expert-driven: a mathematical model is designed by a human modeler for both lesions and lesion confounders, and the model parameter space is subsequently traversed to generate (different) artificial image samples
2) data-driven: a set of annotated image samples is used.

In an aspect, modeling the lesions mathematically is convenient in the sense that no training images are required: the human brain is able to generalize out verbal descriptions by clinicians, though a limited number of samples can serve the modeler (usually an experienced programmer) well. Moreover, no additional annotations are required each time the method is applied to a new dataset. On the other hand, deciding how to model the target lesions is subjective and biased, and a good description may not (yet) be available. Therefore, fully automating the design is attractive, as it makes the proposed approach immediately applicable to a wider range of lesion detection problems, and any modeling bias is avoided. The purpose of this paper is to illustrate the proposed optimal filter framework and perform numerical tests of detection performance of detecting microaneurysms and drusen in retinal images.

In an aspect, a method of identifying an object of interest in digital images can comprise: obtaining first samples of an intensity distribution of one or more objects of interest in one or more of the digital images based upon one or more wavelength bands; obtaining second samples of an intensity distribution of confounder objects in one or more of the digital images, at a predetermined frequency; transforming the first and second samples into an appropriate first space; performing dimension reduction on the transformed first and second samples, whereby the dimension reduction of the transformed first and second samples generates an object detector; transforming one or more of the digital images into the first space; performing dimension reduction on the transformed digital images, whereby the dimension reduction of the transformed digital images generates one or more reduced images; classifying one or more pixels of the one or more reduced images based on a comparison with the object detector; and identifying one or more objects of interest in the reduced digital images from the classified pixels.

In another aspect, a method of identifying an object of interest in a plurality of digital images configured as an image group can comprise: obtaining first samples of an intensity distribution of one or more objects of interest in the image group based upon one or more wavelength bands; obtaining second samples of the intensity distribution of confounder objects in the image group, at a frequency high enough to affect a pre-defined performance metric; transforming the first and second samples into an appropriate first space; performing dimension reduction on the transformed first and second samples, whereby the dimension reduction of the transformed first and second samples generates an object detector; transforming the image group into the first space; projecting the transformed image group into the reduced dimension space to generate a reduced image group; classifying each pixel in the reduced image group with an appropriate neighborhood based on a comparison with the object detector; and automatically identifying one or more objects of interest in the reduced image group from abnormal pixels based upon the comparison with the object detector.

In a further aspect, a system can comprise: a memory for storing digital images; and a processor in communication with the memory, the processor configured to: obtain first samples of an intensity distribution of one or more objects of interest in one or more of the digital images based upon one or more wavelength bands; obtain second samples of an intensity distribution of confounder objects in one or more of the digital images, at a predetermined frequency; transform the first and second samples into an appropriate first space; perform dimension reduction on the transformed first and second samples, whereby the dimension reduction of the transformed first and second samples generates an object detector; transform one or more of the digital images into the first space; perform dimension reduction on the transformed digital images, whereby the dimension reduction of the transformed digital images generates one or more reduced images; classify one or more pixels of the one or more reduced images based on a comparison with the object detector; and identify one or more objects of interest in the reduced digital images from the classified pixels.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 8 is a representation of an exemplary image determination;
FIGS. 10A-10D are exemplary graphs of time complexity assessments.

DETAILED DESCRIPTION

Figure 1:
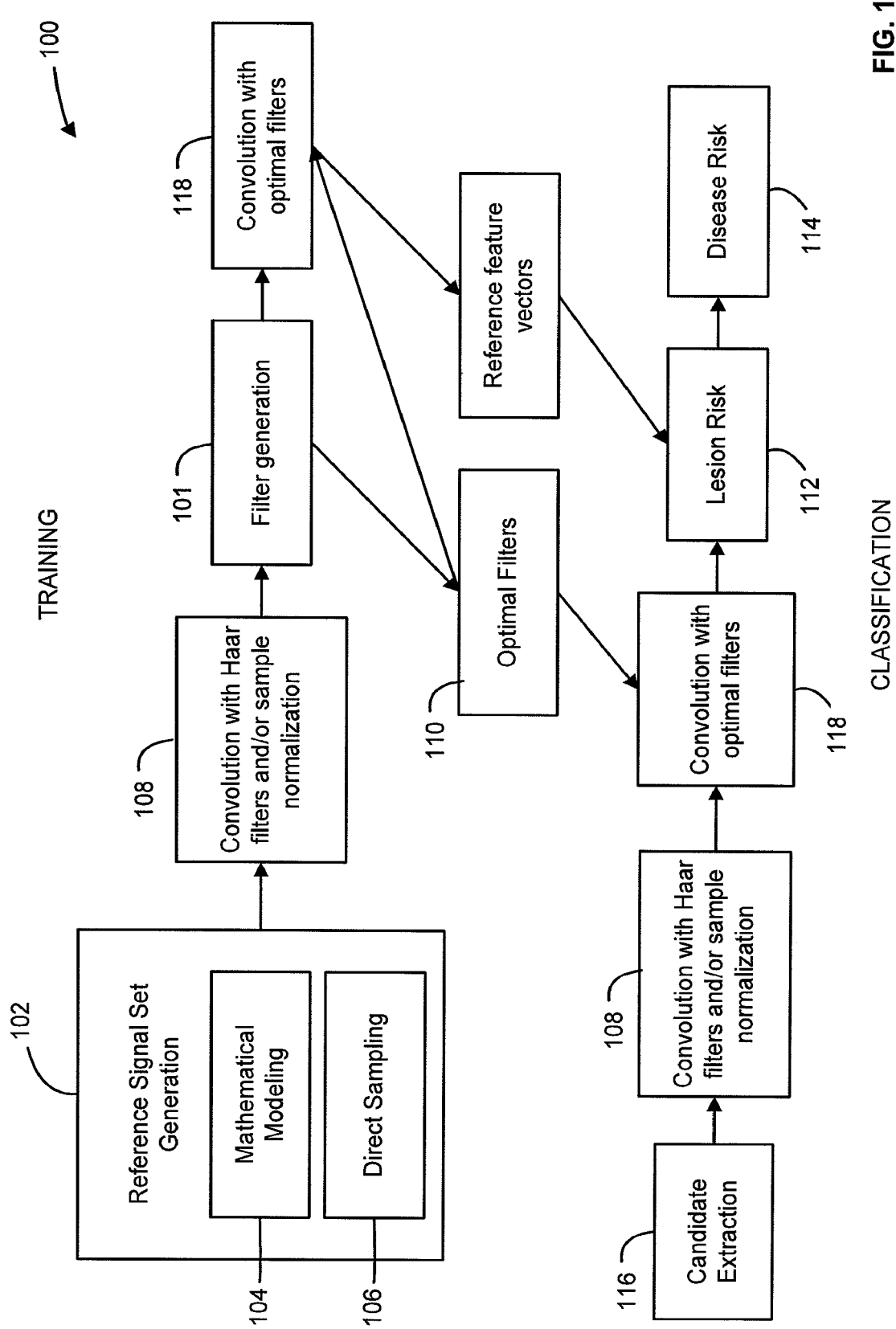
FIG. 1 is a flow diagram of an exemplary method.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

'Optimal' means that objects in background are detected equal than or better than any other method using the same user input.

An "object" is defined as: a regular or irregular region in an image with defined borders contained within a digital image.

An "object of interest" is defined as an object that most closely resembles the concept that the user(s) are interested in detecting in background. In the case of medical diagnosis, these may be lesions or abnormalities. In the case of retinal diagnosis, these may include but not limited to: microaneurysms, dot hemorrhages, flame-shaped hemorrhages, subintimal hemorrhages, sub-retinal hemorrhages, pre-retinal hemorrhages, micro-infarctions, cotton-wool spots, and yellow exudates.

A "feature" is defined as: a group of one or more descriptive characteristics of objects of interest A "set of features" is defined as: a customized group of one or more descriptive characteristics of objects of interest A "threshold" is defined as: a level, point, or value above which something is true or will take place and below which it is not or will not, such levels, points, or values include probabilities, sizes in pixels, and values representing pixel brightness, or similarity between features.

"Background" is defined as all the regions in all images that are not objects of interest.

A "supervised procedure" is defined as: a computer programming method wherein a program learns a function from examples of inputs and outputs.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 is a block diagram illustrating an exemplary method. This exemplary method is only an example of an operative method and is not intended to suggest any limitation as to the scope of use or functionality of operating environment architecture. Neither should the operating environment be interpreted as having any dependency or requirement relating to any one or combination of components illustrated in the exemplary operating environment.

In an aspect, the method 100, illustrated in FIG. 1, can comprise generating an optimal set of filters, at 101, to differentiate objects of interest such as lesions and positive and negative lesion confounders, for example. As an example, an optimal filter framework for detecting target lesions can comprise obtaining a representative set of samples from one or more of lesions, positive lesion confounders, and negative lesion confounders, at 102. As an example, a set of filters, or a basis, can be derived from the samples to optimally represent the samples. Although the description of FIG. 1 is directed to lesions and lesion confounders, other objects of interests can be detected and differentiated in a similar manner using the systems and methods described herein.

In an aspect, the representative set of samples can uniformly describe the space of all possible samples (e.g., lesion samples), as well as the space of possible confounders (e.g., negative lesion). As an example, the most common lesion confounders can be sampled.

In an aspect, the design of an exemplary filter can be defined as one of the following:

1) expert-driven: a mathematical model can be designed by a modeler for both lesions and lesion confounders, and the model parameter space can be subsequently traversed to generate (different) artificial image samples; and
2) data-driven: a set of annotated image samples can be used.

In an aspect, the method of FIG. 1 can comprise a training stage and a classification or test stage as shown, as shown in FIG. 1. As an example, during the training stage, a set of images (e.g., digital images with expert-annotated objects), can be used to build one or more object filters, and to optimize the classification.

In an aspect, internally the training set of images can be divided into a first subset and a second subset. As an example, the first subset can be used to build an optimal set of object filters. As a further example, the second subset can be used to perform feature selection on the optimal set of object filter, resulting in selected filters. A classifier can be trained based on the selected filters, resulting in a trained vision machine for which the performance can be determined.

In an aspect, during a test stage, the objects in a test images set (e.g., retinal images) are detected and localized by the system and are compared to the annotation of an expert. As an example, to maintain generality and robustness, one or more of the first and second subsets and the filters are representative samples from the real data that are kept entirely separated.

In an aspect, by the proposed framework(s) described herein, a set of filters can be obtained to form a feature space and reference points in the feature space. As an example, an unknown fundus image under detection can be first transferred into the feature space and each pixel can be assigned the probability of being a bifurcation, thus a soft probability map of bifurcations can be generated.

The following description details the exemplary steps of various aspects of the proposed framework(s), including the sample generation, filter generation, bifurcation detection and feature selection.

As explained above, both/either an expert driven (e.g., mathematical modeling 104) and/or data-driven design (e.g., direct sampling 106) approach can be used in order to obtain samples representative of the objects (e.g., lesion) of interest, as well as samples from positive lesions confounders, negative lesions confounders or any combination of these.

As an example, in the expert-driven approach (e.g., mathematical modeling 104), a modeler can be configured to translate verbal descriptions with clinicians, as well as intensity distributions in a limited number of samples selected by the clinicians, into mathematical equations. In an aspect, the mathematical equations can be based upon a continuous model of the intensity distribution of the modeled lesions, and were defined for typical lesions, for positive lesion confounders if any are identified, and for negative lesion confounders, if any are identified. As a further example, the intensity profile of the lesions can be modeled by generalized Gaussian functions of normalized intensity, for example, such as the following function:

$$\text{profile}(r;\beta,\delta)=\delta e^{-r^\beta}$$

where r is the distance to the center of the profile divided by its standard deviation, $\beta$ characterizes the sharpness of the contours and $\delta$ is the amplitude ($\delta=1$ for drusen, $\delta=-1$ for microaneurysms).

In an aspect, the typical intensity distribution for both microaneurysms and drusen can be modeled as:

$$\text{typical}(x, y; \alpha_1, \alpha_2, \beta, \theta) = \text{profile}(r; \beta, \delta)$$
$$u = x\cos(\theta) + y\sin(\theta)$$
$$v = -x\sin(\theta) + y\cos(\theta)$$
$$r = \sqrt{\left(\frac{u}{\alpha_1}\right)^2 + \left(\frac{v}{\alpha_2}\right)^2}$$

Figure 2:
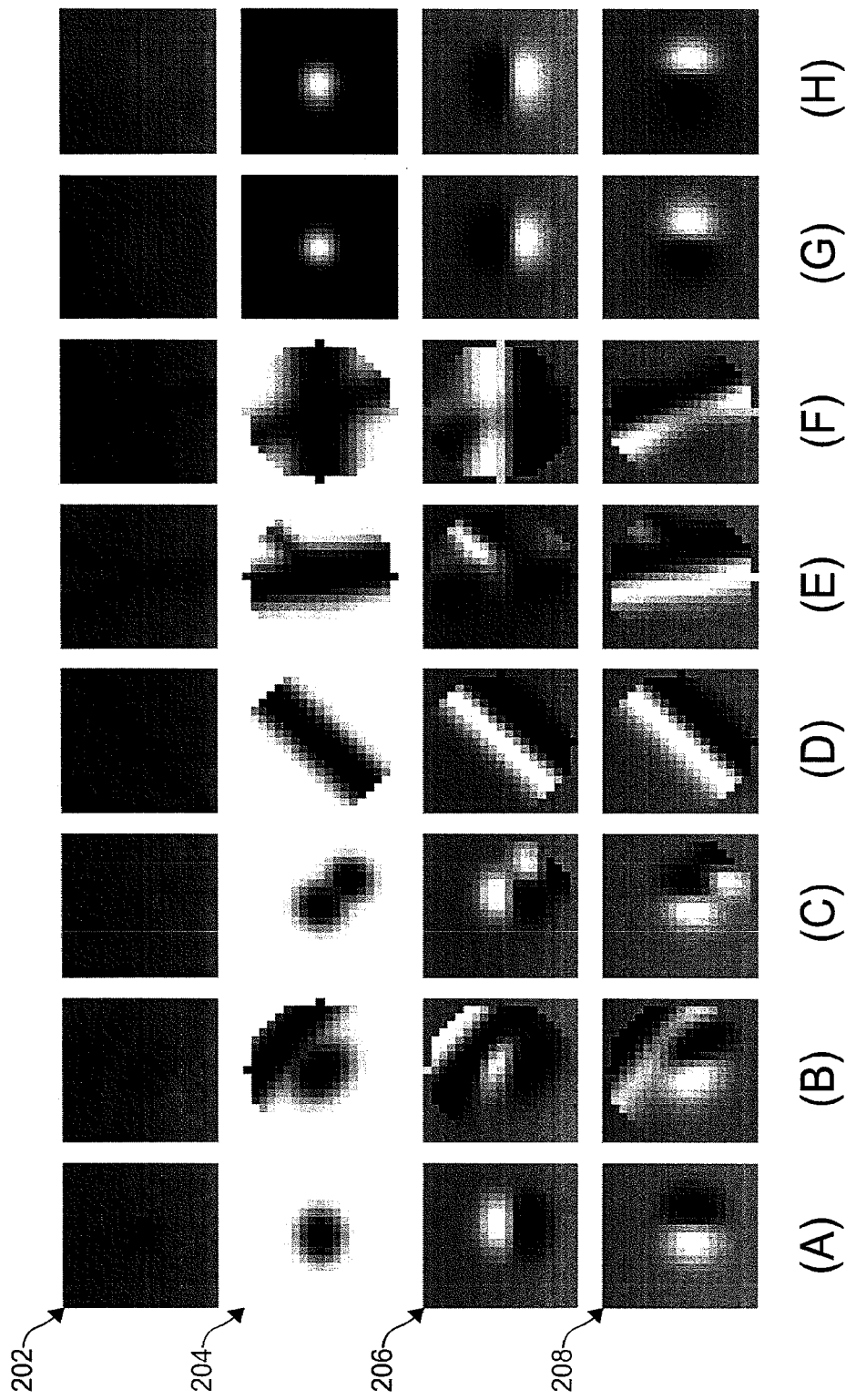
FIG. 2 is an exemplary representation of image samples.

As an illustrative example, a plurality of image samples and samples derived from the models are provided in FIG. 2. Other images in various domains can be processed in a similar manner. Examples of image samples (first row 202) and similar samples derived from mathematical models in the spatial domain (second row 204) and after convolution with Haar filters (third row 206: vertical Haar filter, fourth row 208: horizontal Haar filter). The first six samples can come from the microaneurysm detection problem: a typical lesion (a), positive lesion confounders (b), (c) and negative lesion confounders (d), (e), (f). The last two samples come from the drusen (g) versus flecks (h) classification problem.

In an aspect, a negative microaneurysm confounder can be defined by a linear vessel portion. As an example, the negative microaneurysm confounder can be model by:

$$\text{linearVessel}(x, y; \alpha, \beta, \theta) = \text{profile}\left(\left|\frac{v}{\alpha}\right|; \beta, -1\right).$$

In an aspect, a negative microaneurysm confounder can be defined by a vessel branch: three linear segments, modeled by $$\text{linearVessel}(x, y; \alpha, \beta, \theta) = \text{profile}\left(\left|\frac{v}{\alpha}\right|; \beta, -1\right),$$

can meet at the center of the model I, where the three intensity distributions, I1, I2 and I3, are fused and can be empirically expressed as I=(I1+1)(I2+1)(I3+1)−1.

In an aspect, a negative microaneurysm confounder can be defined by a vessel crossing: two vessels, modeled by $$\text{linearVessel}(x, y; \alpha, \beta, \theta) = \text{profile}\left(\left|\frac{v}{\alpha}\right|; \beta, -1\right),$$

meet at the center of the model, where the two intensity distributions, I1 and I2, are fused. Since the two vessels overlap, the intensity is darker at the center of the model I. As an example, the confounder can be empirically expressed as:

$$I = -\sqrt{I_1^2 + I_2^2}$$

In an aspect, positive lesion confounders for microaneurysm detection can be modeled by a translation of one or more of the following functions:

$$\text{typical}(x, y; \alpha_1, \alpha_2, \beta, \theta) = \text{profile}(r; \beta, \delta)$$

$$\text{linearVessel}(x, y; \alpha, \beta, \theta) = \text{profile}\left(\left|\frac{v}{\alpha}\right|; \beta, -1\right)$$

In an aspect, negative lesion confounders can be modeled for drusen detection. As an example, a pisciform intensity distribution can be used. As a further example, the pisciform intensity distribution can be used to model Stargardt's disease flecks, as illustrated below:

$$\text{fleck}|_{u>0}(x, y; \alpha_1, \alpha_2, \beta, \theta) = \text{profile}(r1; \beta, \delta)$$

$$\text{fleck}|_{u\leq 0}(x, y; \alpha_1, \alpha_2, \beta, \theta) = \text{profile}(r2; \beta, \delta)$$

$$r1 = \sqrt{\left(\frac{u}{\alpha_1}\right)^2 + \left(\frac{v}{\alpha_2}\right)^2}$$

$$r2 = \sqrt{\frac{u^2 + v^2}{\alpha_1^2}}$$

where $\text{fleck}|_{u>0}$ (resp. $\text{fleck}|_{u\leq 0}$) is the tail (resp. head) of the goldfish. As a further example, positive lesion confounders can be modeled for drusen detection.

Figure 3:
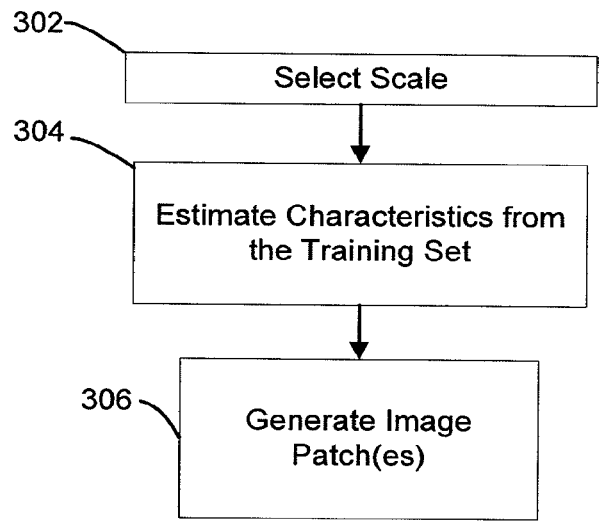
FIG. 3 is a flow diagram of an exemplary method.

In an aspect, once the intensity distribution of the lesions and lesion confounders are modeled, samples can be generated from each intensity distribution model according to the exemplary method illustrated in FIG. 3. Although lesion detection is used as an example, other objects of interest can be used in various domains.

In step 302, a scale for the generated samples can be selected based on an estimation of the typical size of the lesions and lesions confounders in images. As an example, the generated image samples can be defined as circular image patches of radius R times as wide as the typical lesion size (e.g., R=3). As an example, a wide ratio R can be selected since most negative lesion confounders look similar to the lesions at the center of the patch. As a further example, lesions can be discriminated from negative lesion confounders by the periphery of the patch. As a further example, for microaneurysm detection, vessel crossings may look similar to a microaneurysm at the center, but, as opposed to microaneurysms, there will be linear structures, oriented toward the center of the patch, at the periphery.

In step 304, for each parameter $\pi_i$ of a model (the standard deviations $\alpha_1$ and $\alpha_2$ of the lesions, the angle between vessel segments, the distance between two neighboring lesions, etc.), a range $[\pi_i \min; \pi_i \max]$ of variation can be estimated from the training set.

In step 306, image patches can be generated from each model by uniformly sampling the product space $$\Pi_i[\pi_i^{min}; \pi_i^{max}].$$

Although many parameters might be normally distributed across actual lesions, a uniform sampling ensures that rare lesions are equally well characterized. However, other samplings can be used.

In an aspect, a color model can be used to improve further the presented graylevel modeling of the lesions. As an example, gray levels in the generated samples are mapped to colors, using a look-up table (e.g. intensity 0—the background—can be mapped to pale orange and intensity −1—the center of vessels and microaneurysms—can be mapped to dark red, for example). If the scale range for the target lesion is very important, then different sizes of patches can be generated.

In an aspect, an advanced physical model of the lesion transform, i.e. the effect the local pathology has on overlying and surrounding tissue, can be created, thus completely predicting the visual appearance of the lesions and lesion confounders. However, such a model would be highly complex, and more importantly, its design would require substantial domain knowledge, as well as a substantial amount of experiments to perfect it for each new application. Modeling is even more challenging if color is involved: a direct sampling color model simply requires sampling in the entire color space, instead of complex modeling of the interaction of color channel intensities. Hence, a data-driven or direct sampling approach has many advantages.

In direct sampling, the target lesions (e.g., typical lesions and positive lesion confounders) can be annotated on a training dataset. As an example, the annotation comprises an indication of the center of the lesions, or segments the lesions. In an aspect, a candidate lesion detector can be used to find a center of the lesion within the segmented region. As an example, a set of sample images can represent all images and all local image variation that the proposed filter framework may encounter to optimize the framework.

Returning to FIG. 1, in an aspect, in order to increase the representativeness of the reference samples, one or more initial steps can be performed, at 108. First, the variability due to the noise potentially embedded in the reference samples can be minimized. Second, the generality of the reference samples can be increased by a normalization process.

In an aspect, the presence of low-frequency noise (slow background intensity variation) and high-frequency noise (salt-and-pepper noise, compression artifacts, etc.) is typically a major problem for characterizing the appearance of lesions in retinal images. Accordingly, the noise-free samples S and/or noisy samples S+N can be projected into a transformed space where the signal-to-noise ratio is high, such as $T(S) \approx T(S+\mathcal{N}) \approx T(S+\mathcal{N}')$, where T is the transform operator, and N and N' are two realizations of a random noise. As an example, image samples can be convolved with horizontal and vertical Haar filters, at 108, dilated by a factor s to match the typical scale of the lesions (s=2 in our applications).

In an aspect, representative samples characterize the range of variations for the shape, the intensity and the color of the target lesions and lesion confounders. One of these parameters, the intensity of the object can easily be normalized across samples, at 108. Normalizing this parameter reduces the dimensionality of the problem, without significantly affecting the quality of the image sample representation. In particular, a higher generalization ability can be achieved with the same number of image samples (see FIG. 9). As a consequence, less images need to be annotated. Normalizing the intensity of samples generated by a mathematical model can be trivial: the intensity at the center of the model simply needs to be set to one. Normalizing the intensity of samples directly extracted from images, on the other hand, is not: for a reliable estimation of the lesion intensity, the intensity distribution in the target sample is matched to the intensity distribution in the average sample using the least mean squared algorithm, in the transformed space of high signal-to-noise ratio. Finally, the intensity of each pixel in the transformed sample can be divided by its estimated intensity.

In an aspect, the reference samples for lesions and lesion confounders, can be projected in the transformed space of high signal-to-noise ratio and subsequently normalized. As an example, the reference samples can be maximally representative of all lesions and lesion confounders, provided that these are also projected into the transformed space and normalized. In the absence of time constraints, classifying a new sample can be reduced to finding the most similar reference samples, in a least square sense. In other words, the normalized transformed space described above can be used as feature space for classification with a k-NN classifier. Because it is desirable to achieve close to instantaneous detection, the dimensionality of the feature space can be configured to be as low as possible. As an example, the reference samples can be relied upon to find the filters generating the optimal feature space for classifying new samples: a reduced feature space preserving information in the least square sense.

In an aspect, for any desired feature space dimension, the optimal projection for given samples (the transformed and normalized reference samples in our case), in terms of information preservation in least square sense, can be provided by the Principal Component Analysis (PCA) of these samples. As an example, PCA is an orthogonal linear transformation that transforms the set of samples into a new coordinate system such that the greatest variance, by any projection of the data, comes to lie on the first coordinate, the second greatest variance on the second coordinate, etc.

In an aspect, each sample can be considered as a single observation, through applying PCA on the set of samples, principal components can be obtained which can be the same size as the samples. These principal components can be the optimal filters because the linear combination of these filters represents the entire set of samples, and the coefficients of the linear combination can be obtained by the convolution of original samples with corresponding filters.

The optimal filters thus found can span the initial, high dimensional feature space into which any image pixel can be projected. In an aspect, bifurcations in a training set can be projected into the feature space in this way to form the positive reference points. Non-bifurcation points can be randomly sampled in the training set and projected into the feature space in the same way to form the negative reference points. Both of bifurcation and non-bifurcation points together can form the reference points in the feature space. For computational efficiency, sampled pixels from the training set can be projected into the initial feature space by convolving them with the filters for later usage.

In an aspect, given a set of optimal filters 110, previously unseen images and image regions can be classified within this optimal feature space. A so-called risk of presence of the target lesion can derived for each of the image samples, at 112. This risk can subsequently be used to segment the lesions in the image, or, to derive an automated probabilistic diagnosis for the entire image, at 114.

Figure 4:
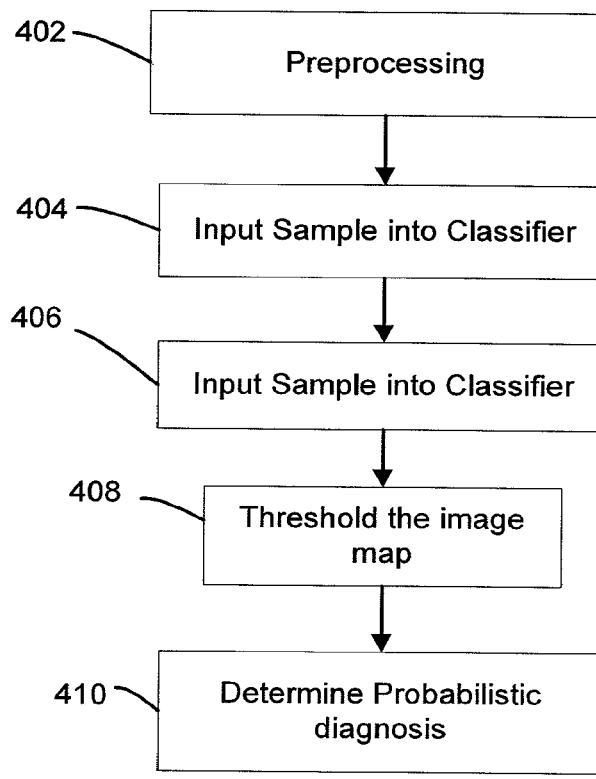
FIG. 4 is a flow diagram of an exemplary method.

In an aspect, images can be processed based upon the method illustrated in FIG. 4. However, other sequences, steps, and processes, can be used and applied in various domains.

In step 402, a preprocessing step can be used to identify and normalize candidate target lesions in an image. In step 404, for each pixel pi;j selected in the preprocessing step 402, the normalized neighborhood of the pixel—the sample—is input to the classifier. As an example, the risk of presence of the target lesion is computed by the classifier for pi;j and a lesion risk map is thus obtained, at 406. In step 408, if the lesions need to be segmented, the risk map defined in step 406 is thresholded, and the connected foreground pixels are identified using morphological labeling. Each connected component is regarded as an automatically detected lesion, and this lesion is assigned a risk value defined as the maximal pixelwise risk of presence within the connected component. In step 410, if a probabilistic diagnosis for the entire image is desired/required, the risks assigned to each automatically detected lesions are fused. Typically, if a single type of lesions is detected, the probabilistic diagnosis for the image is simply defined as the maximum risk of presence of a target lesion.

Returning to FIG. 1, in an aspect, a candidate extraction step 116 is required for both selecting reference negative lesion confounders in the direct sampling and selecting the pixels that should be fed to the classifier when processing unseen images.

Figure 5:
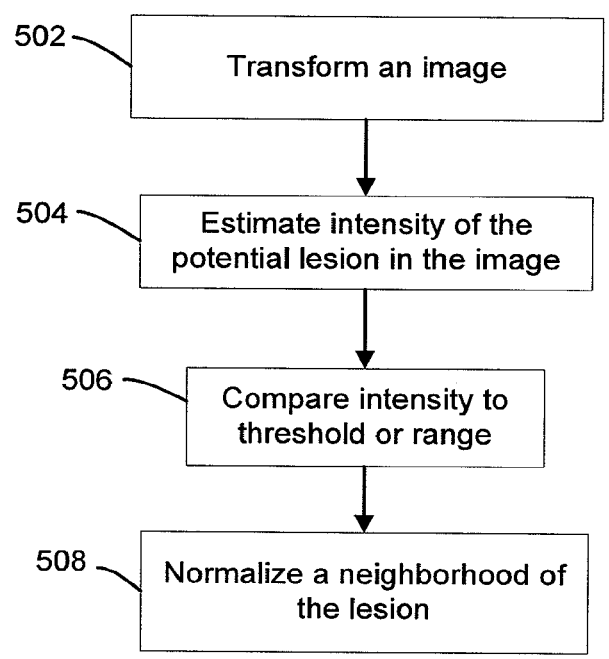
FIG. 5 is a flow diagram of an exemplary method.

As more clearly shown in FIG. 5, the first step to extract candidates in an input image is to transform the image, at 502. As an example, the techniques discussed at step 108 can be used to transform the image. However, other transforms can be used. For each pixel pi;j in the transformed image, the intensity of the potential lesion within the neighborhood Ni;j of the pixel pi;j can then be estimated, at 504. As an example, the techniques discussed at step 108 can be used to estimate intensity of pixels of the image. However, other estimation processes and methods can be used.

In step 506, the intensity of the potential legion can be compared to a threshold or pre-defined range value. If the intensity of the potential lesion is outside the normal range of intensities for the target lesions—the range observed on the training set plus a margin —, pi;j is rejected as a potential lesion. As an example, it is preferable to discard candidates with low intensity (the background): by chance, magnified background pixels might look similar to the target lesions; similarly, attenuated pigment clumps or attenuated small nevi might look like lesions, so candidates with an unusually high intensity should be discarded. If the lesion intensity is within that range, the neighborhood Ni;j is normalized (i.e. divided by the estimated intensity), at 508, before being further classified.

As an example, when this candidate extraction step is used to select reference negative lesion confounders in the direct sampling approach, the candidates pixels pi;j are selected using a manually tuned constant threshold on the average pixel-to-pixel squared distance to the average transformed and normalized positive lesion sample (=0.3). Note that this candidate extraction step is related to the classifier described in.

Returning to FIG. 1, in an aspect, since the set of filters generating the optimal feature space, at 118, can be derived from a representative set of lesions and lesion confounders, a straightforward approach to classify new image samples within the optimal feature space can be to find the most similar representative samples within this space. A lesion risk can be computed (e.g., at 112) for a new sample from the distance to these representative samples and their label. As an example, the distance between two samples is simply defined as the Euclidian distance between their projections on the optimal set of filters. Approximate nearest neighbor search, based on k-d trees, can be applied to find the most similar reference samples.

Once the k most similar samples $(r_i)_{i=1 \ldots k}$ of label $(l((r_i)))_{i=1 \ldots k}$ have been found, the presence risk $\rho(s)|$ is defined for the new sample s as follows:

$$\rho(s) = \frac{1}{k}\sum_{i=1}^{k} l(r_i)\exp(-\|r_i - s\|)$$

where $l(r_i)=1$ if $r_i$ is a target lesion (typical lesion or common positive lesion confounder) and $l(r_i)=-1$ if $r_i$ is a common negative lesion confounder. This risk ranges from −1 (high risk of being negative) to 1 (high risk of being positive). If the new sample is neither a typical lesion nor a lesion confounder, then the distance to the most similar reference samples is likely to be high. As a consequence, a risk close to zero should be measured. In particular, if background pixels are not discarded by the candidate selection step, it is likely that a risk close to zero is measured.

In an aspect, if the set of reference samples is representative of the negative (resp. positive) lesion confounders, then false positives (resp. false negatives) should only occur for rare negative (resp. positive) lesion confounders. Accordingly, system performance and system complexity can exchanged by adjusting our definition of "common" and "rare" lesion confounders.

In an aspect, selecting the optimal filters and generating the reference points in the feature space, the filters and reference points can be used to classify whether a pixel in a fundus image is a bifurcation. An image under detection can be transferred into the feature space by being convolved with the optimal filters so each pixel corresponds to a query point. As an example, the k-Nearest Neighbor algorithm (k-NN) can be used to classify the query points. As a further example, Approximate Nearest Neighbor (ANN) can be applied to classify query points. In an aspect, soft classification and the probability of a query point to be a bifurcation can be calculated by p=n=k, in which k means the number of neighbors considered and n is the number of positive points among the k nearest neighbors. Thus, a probability map of the original image reflecting the probability of every pixel to be a bifurcation can be obtained. In an aspect, Even though the dimension of feature space can be the number of chosen optimal filters (i.e. PCs), it is still a high dimensional space for classification. Accordingly, feature selection can be applied to select a few of most discriminative and efficient filters.

In an aspect, probability maps can be generated with different optimal filters chosen by Sequential Forward Selection (SFS) for each iteration. As an example, the metric can evaluate the probability maps and give the AUC for the ROC curve for the whole set of probability maps. As a further example, SFS first selects out one filter with the highest AUC, then adds a new filter from the remaining filters such that the two filters have the highest AUC. In an aspect, SFS can add a new filter from the remaining filters to give the highest AUC until the stop criteria of the feature selection is met. As an example, the feature selection stops when the number of selected filters reaches the maximal number of filters, or the AUC starts to decline.

In an aspect, a metric to give the AUC can be pixel-based. Since the probability map is soft labeled, the map can be thresholded to obtain a binary image and evaluate it pixel by pixel. As an example, every pixel P is decided as true positive (TP), false positive (FP), true negative (TN) or false negative (FN) according to its distance to a bifurcation, which is shown by $$P = \begin{cases} TP & \text{if } P \text{ is labeled and } |P-B| < D \\ FP & \text{if } P \text{ is labeled and } |P-B| > D \\ TN & \text{if } P \text{ is unlabeled and } |P-B| > D \\ FN & \text{if } P \text{ is unlabeled and } |P-B| < D \end{cases}$$

where $|P-B|$ is the distance between pixel P and any bifurcation B, and D defines the region of bifurcations.

As an example, when data is highly skewed that the number of negative points (non-bifurcation pixels) is much larger than that of positive points (i.e. bifurcation pixels) in a fundus image, so the ROC is insensitive to the change of specificity due to the large number of true negative, i.e. unlabeled non-bifurcation pixels. For better discriminability of ROC curve, all positive points can be weighed with a factor F larger than 1 by the following equation:

$$F = 2 \times \sqrt{\frac{\text{total No. of negative}}{\text{total No. of positive}}}$$

In an aspect, introduction of factor F can enhance the influence of positive points so the ROC curve is more sensitive to changes of sensitivity and specificity. Assuming there are n images used in feature selection, the metric giving the AUC for the probability maps is outlined as follows:
  a) find the threshold values v0, v1, v2, . . . vk for all probability maps;
  b) for threshold value i=v0, . . . vk
    1. threshold all probability maps and obtain thresholded images mi1, mi2, . . . min;
    2. compute TP, FP, TN and FN for mi1, mi2, . . . min;
    3. sum all TP, FP, TN and FN together for all thresholded images; and/or
    4. calculate the sensitivity and specificity for threshold value I; and/or
  c) compute the AUC according to the pairs of sensitivity and specificity for all threshold values.

Figure 6:
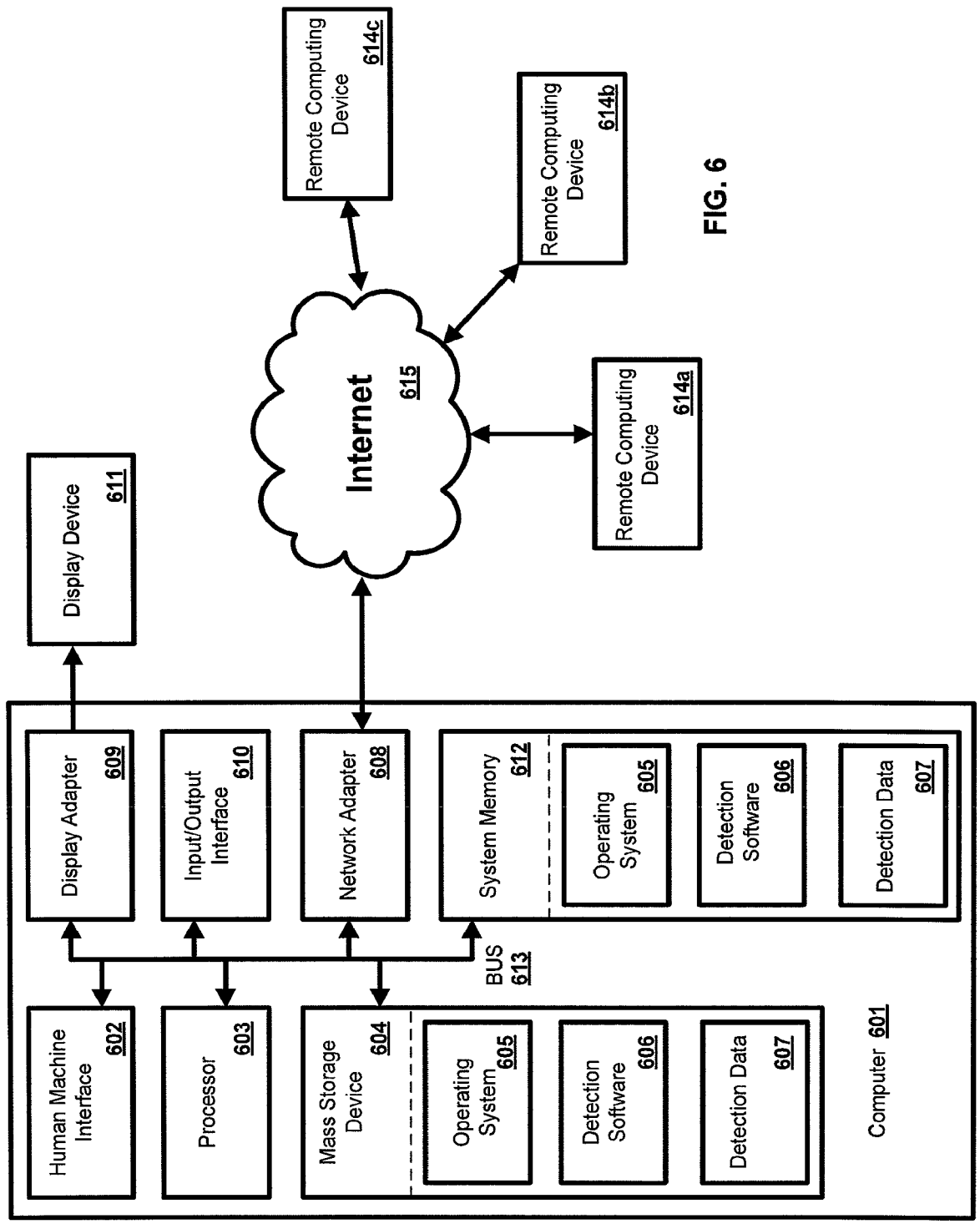
FIG. 6 is a block diagram of an exemplary computing system.

As described in further detail below, one skilled in the art will appreciate that this is a functional description and that the respective functions can be performed by software, hardware, or a combination of software and hardware. A unit can be software, hardware, or a combination of software and hardware. The units can comprise the processing Software 606 as illustrated in FIG. 6 and described below. In one exemplary aspect, the units can comprise a computer 601 as illustrated in FIG. 6 and described below.

FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, processing software 606, processing data 607, a network adapter 608, system memory 612, an Input/Output Interface 610, a display adapter 609, a display device 611, and a human machine interface 602, can be contained within one or more remote computing devices 614*a,b,c* at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as processing data 607 and/or program modules such as operating system 605 and processing software 606 that are immediately accessible to and/or are presently operated on by the processing unit 603.

In another aspect, the computer 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computer 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and processing software 606. Each of the operating system 605 and processing software 606 (or some combination thereof) can comprise elements of the programming and the processing software 606. Processing data 607 can also be stored on the mass storage device 604. Processing data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like.

The computer 601 can operate in a networked environment using logical connections to one or more remote computing devices 614*a,b,c*. By way of example, a remote computing device can be a personal computer, portable computer, a server, a router, a network computer, a peer device or other common network node, and so on. Logical connections between the computer 601 and a remote computing device 614a,b,c can be made via a local area network (LAN) and a general wide area network (WAN). Such network connections can be through a network adapter 608. A network adapter 608 can be implemented in both wired and wireless environments. Such networking environments are conventional and commonplace in offices, enterprise-wide computer networks, intranets, and the Internet 615.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of processing software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, numbers of samples, etc.), but some errors and deviations should be accounted for.

As an example, the proposed system was tested on microaneurysm detection for DR screening and drusen detection for AMD detection. If not mentioned otherwise, the computations were performed in the green channel of fundus images.

A. Microaneurysm Detection

The performance of the proposed framework at detecting microaneurysms was first evaluated at a lesion level, on a set of 100 deidentified images manually segmented by a clinician expert (MDA). Twenty-six of these images were taken from a DR screening program in the Netherlands; these images were originally captured using a Canon CR5 non-mydriatic 3CCD camera at 45 degree field of view; and 74 were obtained Dr. Abramoff's retinal referral clinic; these images were captured using a Topcon TRC-50 at 45 degree field of view.

The size of the images is 768×576 pixels and the field of view is approximately 540 pixels in diameter. 55/100 of the images contained lesions. In these images, a total of 858 red lesions were identified.

Figure 7A:
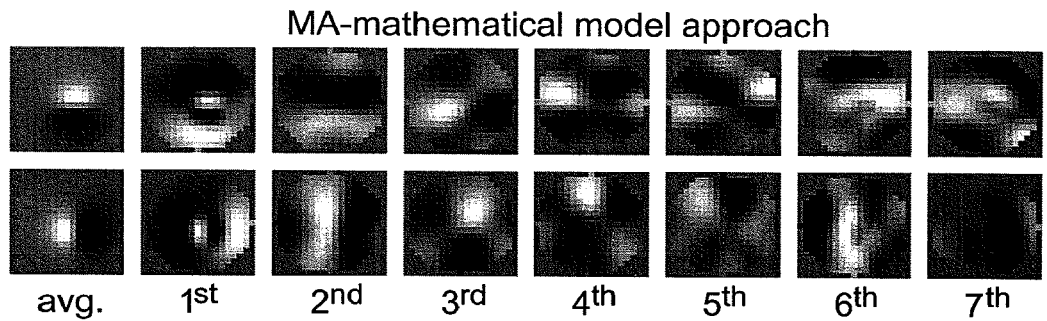
FIGS. 7A-7D are exemplary image samples.
Figure 7B:
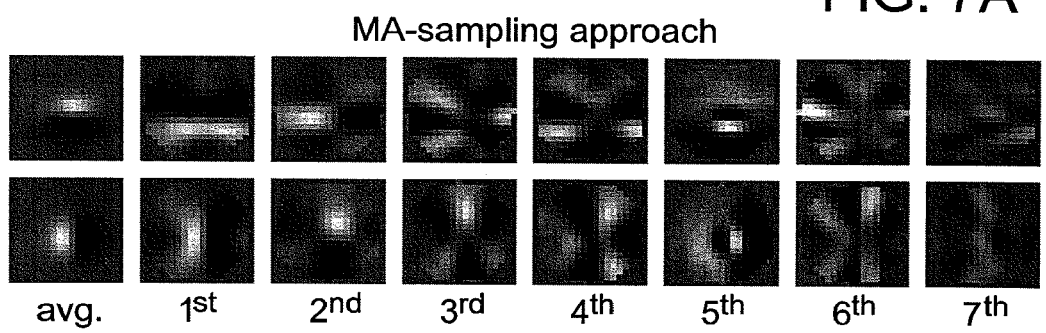

Half of the images in this dataset were used for training and the other half for testing. In order to validate the optimal fitting of the filters to the reference samples, the optimal filtering framework (including confounders) was also compared to an approach were analytical filters are selected to maximize the classification accuracy, by cross-validation, on the set of reference samples ('training set'). The analytical filters used in this experiment were typical: Gaussian derivatives and Gabor wavelets in color opponency space. All other aspects of the method (convolution and normalization of the data, k-NN classifier with the same risk) remained unchanged. The radius of the filters was set to 9 pixels for this application. The optimal filters are reported in FIGS. 7A-7B, wherein The upper row of each filter is convolved with vertical Haar filters dilated by a factor of 2 and the lower row of each filter is convolved with horizontal Haar filters dilated by a factor of 2. As an example, FIGS. 7A-7B illustrate that similar sets of filters can be obtained regardless of the method that is used to collect the set of reference samples.

In an aspect, FIG. 8 illustrates an exemplary microaneurysm detection (e.g., detection image 804) by the proposed mathematical model based method in the macular region of a JPEG-compressed image 802 used in the EyeCheck screening program.

Figure 9:
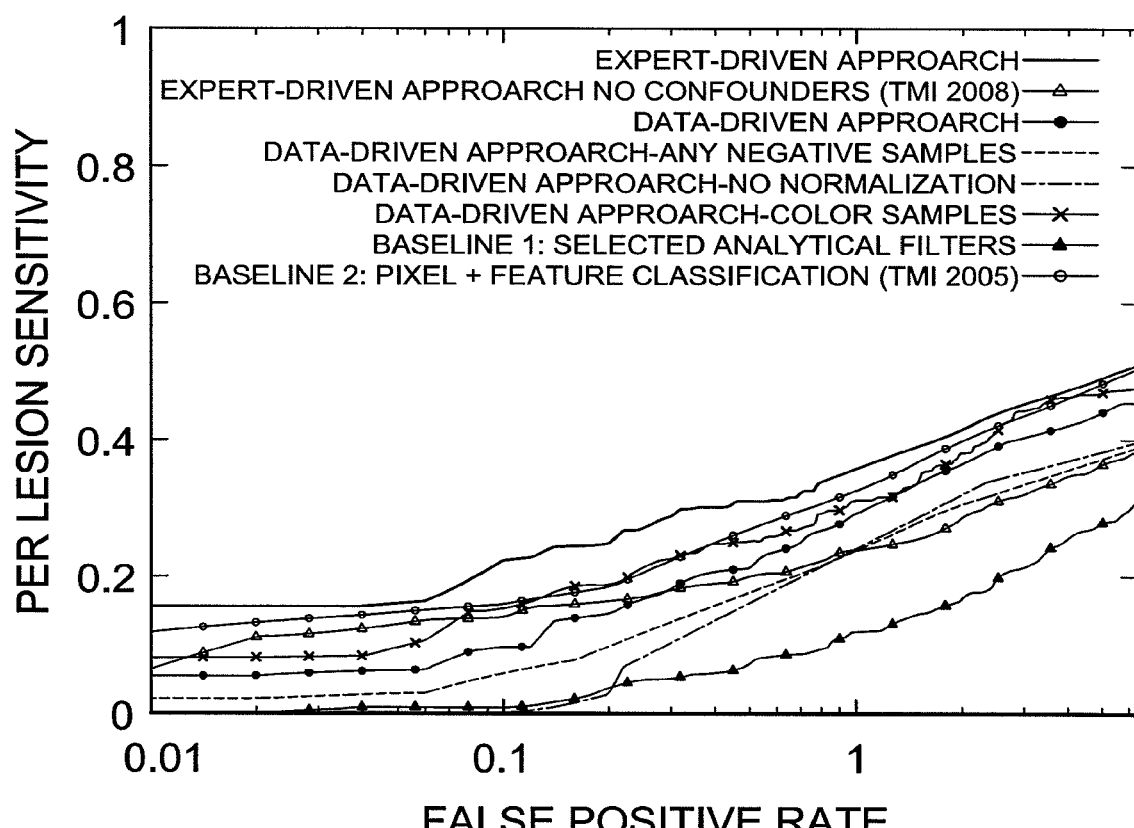
FIG. 9 is a graph of FROC of microaneurysm detection.
Figures 10C, 10D:
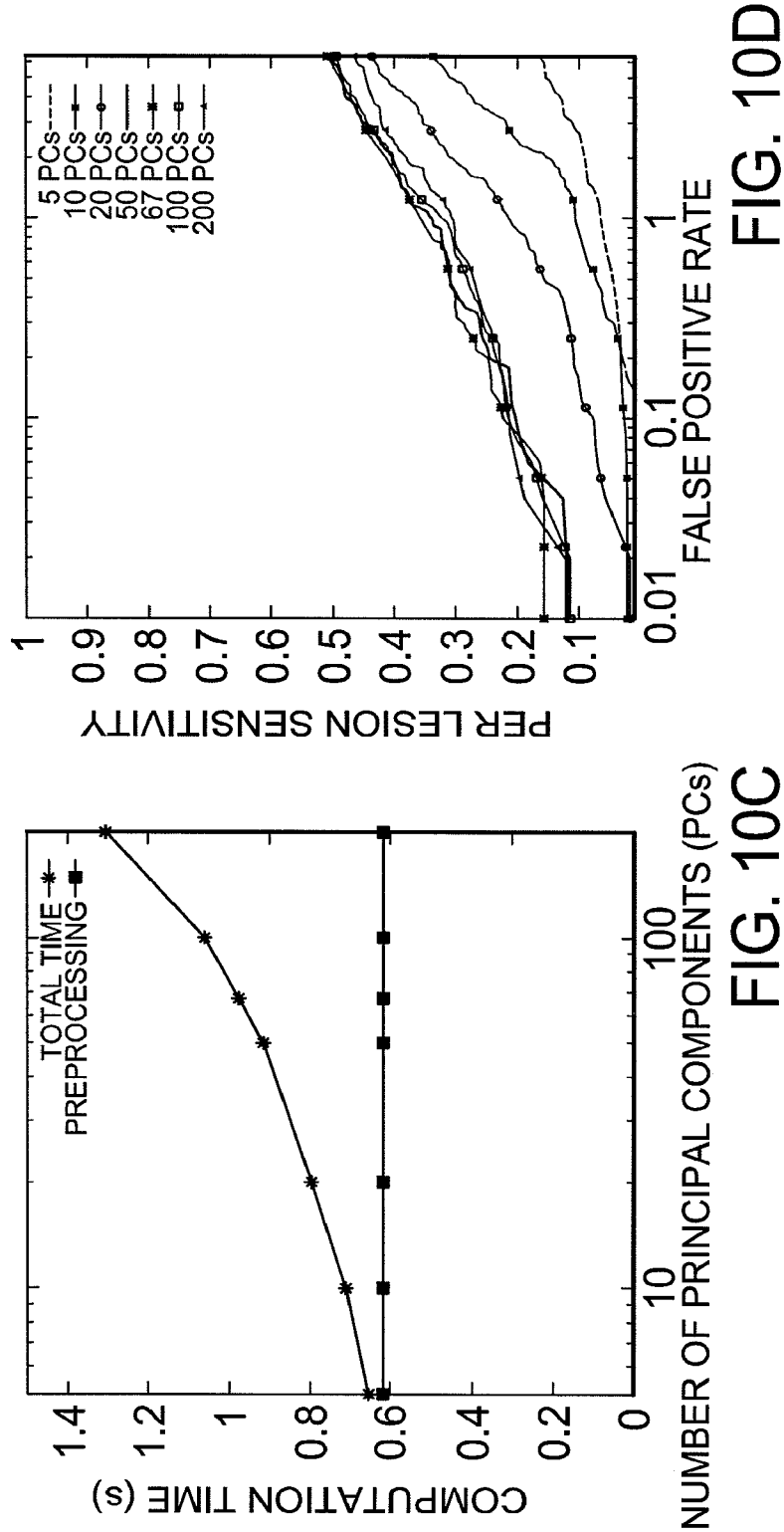

The free-response receiver-operating characteristic (FROC) curves of the different methods on the testing set are reported in FIG. 9, wherein the "Expert driven approach—no confounders" shows the performance obtained with a simplified version of the method where the confounder samples were not in the training set; there were only 2 reference samples: a small and a large typical lesion. "Data-driven approach—any negative samples" shows the performance obtained if the negative reference samples are selected at random outside of the manually segmented regions, instead of being selected among negative lesion confounders (i.e. among false positives of candidate selection). "Data-driven approach—no normalization" shows the performance obtained if the normalization step is omitted both for training and testing.

The time complexity assessment of the method is presented in FIGS. 10A-10D, wherein the computation times were obtained on a standard PC running at 2.26 GHz. Each vertex in FIG. 10A from left to right, corresponds to one curve in FIG. 10B from "299 samples" to "61373 samples." Likewise, each vertex in FIG. 10C from left to right, corresponds to one curve in FIG. 10D from "5 PCSs" to "200 PCs."

For convenience, the time complexity of the mathematical model based approach is studied (it is easier to increase the number of generated samples); similar computations times are obtained with the direct sampling approach.

Once the proposed method was calibrated at a lesion level, the performance of the best performing version of the proposed algorithm (the mathematical-model approach) was compared at an examination level to a re-implementation of Niemeijer's method. This experiment was carried out on a set of images from the same screening program. The size of images and that of the field of view are similar to the previous set. 2,739 consecutive examinations from diabetic patients on their first visit were selected from a set of first visits in 2008. Each examination consists of two images per eye (a macula-centered and an optic disc centered image).

Figure 11:
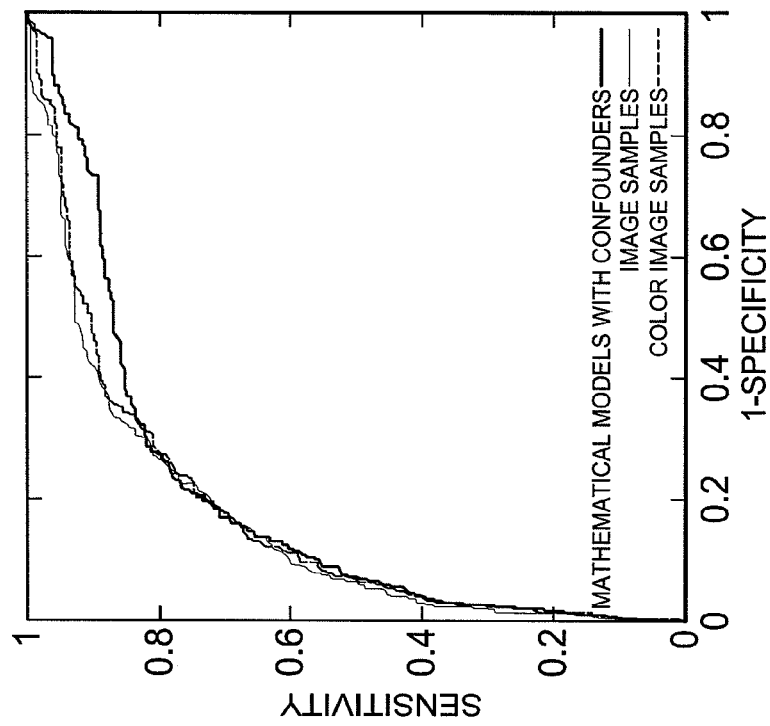
FIG. 11 is an exemplary graph of ROC of microaneurysm detection.

Sixty-seven of them were diagnosed with DR by a single retinal specialist, and the maximal microaneurysm presence risk measured within this set of four images was used as DR risk. The receiver-operating characteristic (ROC) of these two methods are reported in FIG. 11, wherein ROC of microaneurysm detection at an image level on a set of 2,739 patient images, including 67 with referable DR.

B. Drusen Detection

In the second application of the proposed framework, drusen are differentiated from Stargardt's disease flecks. Thus, the lesions and lesion confounders appear in different image sets, and the problem is to differentiate the two types of lesions as to whether they are typical for AMD (drusen) or Stargardt's disease (flecks). A set of 15 images of patients with AMD, all containing drusen, as confirmed by a clinician expert (MDA), and 15 images containing flecks as confirmed to have Stargardt's disease by positive genetic testing for the ABCA4 haplotype were selected. Images were acquired with a Zeiss FF3 30-degree camera and recorded on Kodachrome film (ASA 100). Film-based images were scanned at 3456×2304 pixels, 12 bit depth, using a 3 color channel CCD scanner.

Figure 7C:
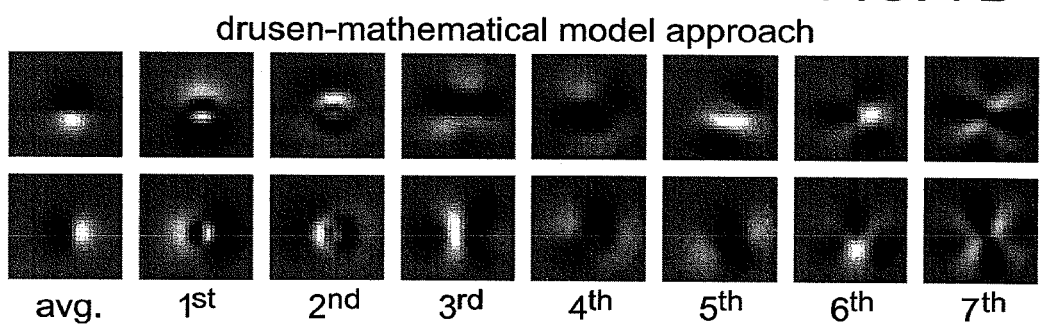
Figure 7D:
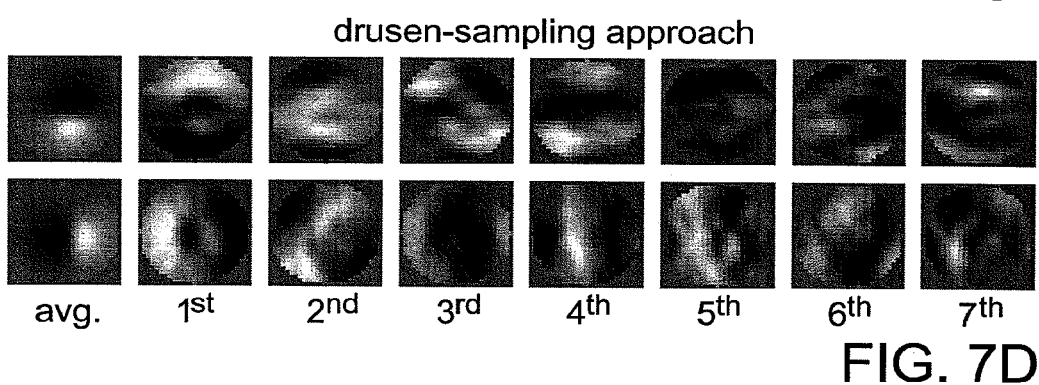
Figure 12:
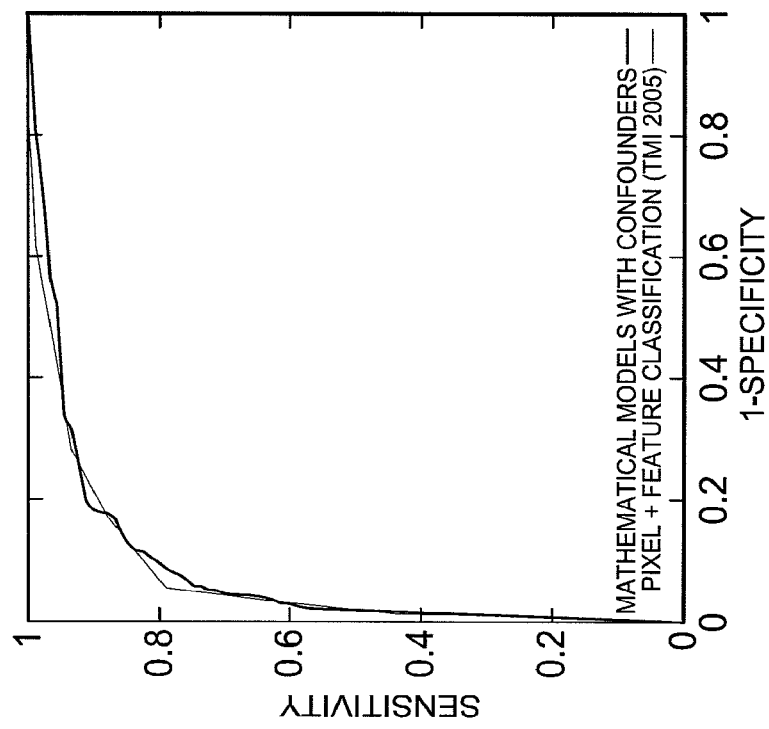
FIG. 12 is an exemplary graph of ROC of drusen versus flecks classification.

A set of 300 drusen and 300 flecks were manually annotated in these images and used as reference samples for the sampling approach. A leave-one-image-out cross-validation was performed to assess the sampling approach. To validate the mathematical model approach, the 600 samples were used as a testing set. The radius of the filters was set to 13 pixels for this application. The optimal filters are reported in FIGS. 7C-7D. The ROC-s are reported in FIG. 12.

Accordingly, a novel, optimal filter framework for detecting target lesions in retinal images has been provided. The framework can comprise a design of a set of filters optimally representing the typical target lesions, as well as the negative lesion confounders, i.e. lesions that are similar looking but not the target lesions, and the positive lesion confounders, i.e. lesions that are easily missed because they have specific properties that are substantially different from the standard case. In order to design the optimal filter set, image samples representative of the three types of lesions are collected and the filters are defined as the principal components of these samples.

Special attention is given in the proposed approach to ensure the representativeness of the reference image samples. Two completely different approaches for obtaining these maximally representative samples are proposed and compared: an expert and a data-driven approach. The optimal filter set is used as a reference to classify new image samples. Because the feature space spanned by these filters is compact, the classification procedure, based on an approximate nearest neighbor search, is fast. This property is particularly important in medical applications such as the instantaneous assessment of retinal diseases.

The optimal filter framework has been tested on the detection of two important lesions in eye disease: microaneurysms and drusen. Our results show that the detection performance achieved by the new optimal filter framework is comparable to that of previous algorithms presented, however the new method is much faster: each retinal image is processed in less than a second, as opposed to several minutes with the previous approach. This implies that instantaneous assessment of retinal images for DR is achievable, while maintaining the performance achieved by previously published algorithms. The results show that the optimal filter framework also has good performance in the differentiation of drusen from Stargardt's disease flecks, illustrating its generality.

The optimal filter sets obtained varied little with the method through which they were obtained. In other words, it mattered little whether the representative samples (from which the optimal filters are derived) are obtained from a mathematical model designed by a non-clinician domain expert, i.e. expert driven, or by directly sampling a representative set of images at locations annotated by one or more expert clinicians, i.e. data-driven, following the sampling procedure described in this paper. Thus, an optimal filter framework, with the set of domain optimal filters obtained directly from image samples, and only requiring expert clinician input for annotating, performs close (for DR detection) or equivalent (for drusen versus flecks differentiation) to a system in which the filters require the design of a model by a non-clinician expert. The data-driven approach is expected to generalize well to other retinal image analysis problems, and possibly, to other medical image analysis problems, because only limited clinician expert annotation effort is required, and no further domain knowledge is required on the designer of the framework. Its generality and lack of bias is illustrated also by the fact that incorporating color into the representative samples results in equal or superior performance compared to samples from a specific color channel, (the green channel, which is known by domain experts to be more discriminant). If the expert modeler had been biased and assumed that color was irrelevant, and therefore did not incorporate color into their mathematical model, that might have unnecessarily limited the performance. For the data-driven form of the optimal filter framework there is no need to exclude potentially irrelevant color channels a priori. The expert-driven approach was superior to the data-driven approach when the designer of the mathematical models had sound non-clinician expert knowledge (microaneurysm detection). It shows that, if expert knowledge is available, it is possible to push performance further through mathematical modeling. Moreover, should the method be applied to a new dataset, the value of a few parameters could be changed, while in the data-driven approach additional annotation might have been required.

Finally, the results indicate that using a set of filters obtained from factorial coding of the data—in our case, PCA— may be superior, and at least equal, to the set of filters obtained through feature selection on a Gaussian derivative or Gabor wavelet or filterbank. As an example, from all of the potential filter sets in the filter, or feature, space, a small set Gabor or Gaussian derivative filters may be optimal, but that for specific object detection problems, a locally optimal, better performing filter set exists, and can be found in this space through the framework described herein.

C. Bifurcation Detection

In an exemplary experiment, a total of 80 de-identified retinal color images from 80 subjects from a diabetic retinopathy screening program in the Netherlands were created by registration of 2 separate images per patients. The size of images was approximately 800×650 pixels in JPEG format. The number of images in a first training set was 50, and the number of images in a second training set was 10. The number of test images was 20. To build and evaluate a vision system or vision machine, an expert annotated a set of centers of bifurcations in the training sets and test images and a retinal specialist reviewed these annotations for correctness. After annotation, all bifurcation were samples at a scale σ of 25×25 pixels. In the training stage, 10 bifurcations were randomly sampled per image so 500 samples are created, and rotating the samples resulted in 4000 samples. PCA was applied separately on the samples in red, blue and green channels. In an aspect, images in red channels contain the most amount of information and least amount of noise because its cumulative variance (CV) curve rises most rapidly.

As an example, the information of bifurcation samples are concentrated in the first few number of PCs. Thus the first 30 PCs of red and green channels can be selected respectively for feature selection. For the negative points, 2000 non-bifurcations are selected from each training image so there will be 100000 negative points in the feature space. This number is chosen in the consideration that the ratio of true bifurcation and true non-bifurcation is very large, accordingly, a large amount of negative points can be selected to simulate this situation.

In the feature selection step, the maximal number of optimal filters is set to be 10. The distance D that defines the region of true bifurcation is the square root of 41. In this case the 10 most discriminative filters are 6th PC in red, and 2nd, 3rd, 4th, 5th, 6th, 7th, 18th and 19th PCs in green channels. It is worth noticing that the selected filters depends on the distribution of the reference points and since the negative points are randomly sampled for different reference points feature selection might give different results.

Using these 10 filters, a 10-dimensional feature space was established, within which there are 4000 positive points and 100000 negative points. A k-NN algorithm was used to classify 20 test images with K=33. The metric used to evaluate the results of the 20 test images was the same as in feature selection. The overall AUC was 0.883.

The results show that a vision machine based retinal bifurcation detection method can be developed based solely on a limited number of expert annotated retinal images with exemplar branching points. The results also show that detection performance of the system, compared to a human expert, on a different dataset, as measured by AUC, is satisfactory.

In an aspect, using a vision machine approach as described herein, an automated retinal vessel bifurcation detection system, based on very limited expert contribution. The vision machine, systems and methods described herein can be more widely used to develop simple object search systems for similar applications.

In an aspect, similar approaches (e.g., optimal filter or vision machine) can be used to create detection systems for various objects of interest. As an example, the systems and methods described herein can be used to detect apples in images of orchards, helicopter landing pads in high altitude reconnaissance images, and cell nuclei in phase contrast images of mitotic fibroblasts. Other images and objects of interest can be processed. As a further example, the methods described herein can be highly general but can be trained to be highly specific in a specific domain. Any domain can be used and the systems and methods can be trained for any particular object of interest.

As described herein, a method is disclosed for identifying an object of interest in a plurality of digital images (e.g., ImageORG), where each of these images comprises a plurality of wavelength bands, and each ImageORG comprises a plurality of raw images that were combined into a single ImageORG. As an example, the method can comprise obtaining first samples of the intensity distribution of the object of interest in one or more wavelength bands, obtaining second samples of the intensity distribution of confounder objects, at a frequency high enough to affect a performance metric, transforming the first and second samples into an appropriate space, thereby creating Imagetrans, performing dimension reduction on the transformed first and second samples altogether, whereby the dimension reduction of the transformed first and second samples creates an object detector, transforming ImageORG into the appropriate space to obtain Imagetrans, projecting Imagetrans into the space of reduced dimension to obtain Imagereduc, classifying each pixel p in Imagereduc with an appropriate neighborhood Np, based on a comparison with the samples obtained, and automatically identifying an object of interest from the abnormal pixels.

In summary, a novel, general, optimal filter framework for the detection of lesions in retinal images, derived through factor analysis of the lesions and their confounders, has been presented in this paper and was successfully applied to two important retinal image analysis problems. Potentially, this optimal filter framework can be applied to other lesion detection problems in retinal images, where rapid system development and instantaneous performance are required.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A system for diagnosing a disease condition in a patient, the system comprising:
    one or more computer processors on one or more computers;
    a computer readable medium on the one or more computers;
    an object detection model component stored on the computer readable medium, the object detection model component comprising a set of parameters of a supervised procedure that is trained to:
receive an input image, and
output a probability that the input image contains an object of interest at each of one or more locations within the input image;
an automated diagnostic model component stored on the computer readable medium, the automated diagnostic model component comprising a set of parameters of a diagnostic model that is trained to:
receive the probability that the input image contains the object of interest at each of the one or more locations within the input image, and
output a probabilistic diagnosis of a disease condition depicted in a input image; and
a diagnostic system component stored on the computer readable medium, the diagnostic system component containing instructions configured to cause the one or more computer processors to perform steps comprising:
receiving the input image of the portion of the body of the patient,
passing the input image to the object detection model component,
receiving, from the object detection model component, the probability that the input image contains the object of interest at each of the one or more locations within the input image,
passing, to the automated diagnostic model component, the probability that the input image contains the object of interest at each of the one or more locations within the input image,
receiving, from the automated diagnostic model component, the probabilistic diagnosis of the disease condition for the input image, and
outputting the probabilistic diagnosis of the disease condition.

2. The system of claim 1, wherein passing the input image to the object detection model component comprises:
obtaining one or more samples for each of a set of different regions of the input image; and
applying each of the obtained samples of the input image to the supervised procedure to output a probability that the sample contains one or more objects of interest, where the one or more objects of interest are indicative of the disease condition.

3. The system of claim 1, wherein the supervised procedure comprises a plurality of trained filters, each trained filter configured to identify the probability that the input image contains the object of interest.

4. The system of claim 1, wherein the input image is of a portion of an eye of the patient, and wherein the disease condition comprises a disorder manifesting in the eye.

5. The system of claim 1, wherein the input image is of a portion of an eye of the patient, and wherein the disease condition comprises a disorder manifesting in a retina of the patient.

6. The system of claim 1, wherein the one or more objects of interest comprise an object that has a similar appearance to another object that indicates a disease condition in a patient but that does not itself indicate a disease condition in a patient.

7. The system of claim 1, wherein the object of interest comprises an object selected from a group consisting of: a microaneurysm, a dot hemorrhage, a flame-shaped hemorrhage, a sub-intimal hemorrhage, a sub-retinal hemorrhage, a pre-retinal hemorrhage, a micro-infarction, a cotton-wool spot, a yellow exudate, and a drusen.

8. The system of claim 1, wherein the supervised procedure is trained by a method comprising:
receiving a plurality of training examples, each training example comprising a training image and a label indicating whether the training image contains an object of interest at each of one or more locations within the training image; and
fitting the supervised procedure to the plurality of training examples.

9. The system of claim 8, wherein each of the training images is annotated to indicate one or more reference points that correspond to a center of a feature of interest in the training image.

10. The system of claim 1, wherein the diagnostic model is trained by a method comprising:
receiving a plurality of training examples, each training example comprising a probability that a training input image contains an object of interest at each of one or more locations within the training input image and a label indicating whether the training input image depicts a disease condition; and
fitting the diagnostic model to the plurality of training examples.

11. A method for diagnosing a disease condition in a patient, the method comprising:
receiving an input image of a portion of a body of a patient;
passing the input image to an object detection model that is trained to generate an output that comprises, for each of a set of reference locations in the input image, a probability that the input image contains an object of interest at the reference location, where one or more of the objects of interest are indicative of the disease condition;
passing the output from the object detection model to an automated diagnostic model that is trained to provide a probabilistic diagnosis of the disease condition for the input image based on the output from the object detection model; and
outputting the probabilistic diagnosis of the disease condition from the automated diagnostic model.

12. The method of claim 11, wherein passing the input image to an object detection model comprises:
obtaining one or more samples for each of a set of different regions of the input image; and
applying each of the obtained samples of the input image to the object detection model to output a probability that the sample contains one or more objects of interest, where the object of interest is indicative of the disease condition.

13. The method of claim 11, wherein the object detection model comprises a plurality of trained filters, each trained filter configured to identify a probability that the input image contains an object of interest.

14. The method of claim 11, wherein the input image is of a portion of an eye of the patient, and wherein the disease condition comprises a disorder manifesting in the eye.

15. The method of claim 11, wherein the input image is of a portion of an eye of the patient, and wherein the disease condition comprises a disorder manifesting in a retina of the patient.

16. The method of claim 11, wherein the one or more objects of interest comprise an object that has a similar appearance to another object that indicates a disease condition in a patient but that does not itself indicate a disease condition in a patient.

17. The method of claim 11, wherein the one or more objects of interest comprise an object selected from a group consisting of: a microaneurysm, a dot hemorrhage, a flame-shaped hemorrhage, a sub-intimal hemorrhage, a sub-retinal hemorrhage, a pre-retinal hemorrhage, a micro-infarction, a cotton-wool spot, a yellow exudate, and a drusen.

18. The method of claim 11, wherein the object detection model is trained by a method comprising:
 receiving a plurality of training examples, each training example comprising a training image and a label indicating whether the training image contains an object of interest at each of one or more locations within the training image; and
 fitting the object detection model to the plurality of training examples.

19. The method of claim 18, wherein each of the training images is annotated to indicate one or more reference points that correspond to a center of a feature of interest in the training image.

20. The method of claim 11, wherein the automated diagnostic model is trained by a method comprising:
 receiving a plurality of training examples, each training example comprising a probability that a training input image contains an object of interest at each of one or more locations within the training input image and a label indicating whether the training input image depicts a disease condition; and
 fitting the automated diagnostic model to the plurality of training examples.

* * * * *